(12) United States Patent
Gillespie et al.

(10) Patent No.: US 11,081,107 B2
(45) Date of Patent: *Aug. 3, 2021

(54) CONTEXTUAL ENTITY RESOLUTION

(71) Applicant: Amazon Technologies, Inc., Seattle, WA (US)

(72) Inventors: Kellen Gillespie, Seattle, WA (US); Melanie Chie Bomke Gens, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,533

(22) Filed: Mar. 11, 2019

(65) Prior Publication Data

US 2019/0206405 A1  Jul. 4, 2019

Related U.S. Application Data

(63) Continuation of application No. 15/394,753, filed on Dec. 29, 2016, now Pat. No. 10,229,680.

(51) Int. Cl.
| | |
|---|---|
| *G10L 15/22* | (2006.01) |
| *G10L 15/18* | (2013.01) |
| *G06Q 30/02* | (2012.01) |
| *G06F 40/30* | (2020.01) |
| *G06F 40/295* | (2020.01) |
| *G06F 3/16* | (2006.01) |

(Continued)

(52) U.S. Cl.
CPC ............ *G10L 15/22* (2013.01); *G06F 40/295* (2020.01); *G06F 40/30* (2020.01); *G06Q 30/0201* (2013.01); *G10L 15/1815* (2013.01); *G06F 3/04842* (2013.01); *G06F 3/167* (2013.01); *G10L 15/26* (2013.01); *G10L 2015/223* (2013.01); *G10L 2015/225* (2013.01); *G10L 2015/228* (2013.01)

(58) Field of Classification Search
CPC ..... G06F 3/167; G06F 3/04842; G10L 15/22; G10L 15/26
See application file for complete search history.

(56) References Cited

U.S. PATENT DOCUMENTS

| | | | | |
|---|---|---|---|---|
| 5,781,179 A | * | 7/1998 | Nakajima | ............... G06F 3/038 345/157 |
| 7,558,744 B2 | * | 7/2009 | Razumov | ............... G06Q 20/20 705/26.1 |

(Continued)

*Primary Examiner* — Samuel G Neway
(74) *Attorney, Agent, or Firm* — Pierce Atwood LLP

(57) ABSTRACT

Methods and systems for resolving entities using multi-modal functionality are described herein. Voice activated electronic devices may, in some embodiments, be capable of displaying content using a display screen. Contextual metadata representing the content rendered by the display screen may describe entities having similar attributes as an identified intent from natural language understanding processing. When natural language understanding processing attempts to resolve one or more declared slots for a particular intent, matching slots from the contextual metadata may be determined, and the matching entities may be placed in an intent selected context file to be included with the natural language understanding's output data. The output data may be provided to a corresponding application for causing one or more actions to be performed.

22 Claims, 8 Drawing Sheets

(51) Int. Cl.
 *G06F 3/0484* (2013.01)
 *G10L 15/26* (2006.01)

(56) References Cited

U.S. PATENT DOCUMENTS

| | | | |
|---|---|---|---|
| 9,070,366 B1* | 6/2015 | Mathias | G10L 15/22 |
| 9,520,133 B2* | 12/2016 | Cha | G06F 3/167 |
| 10,229,680 B1* | 3/2019 | Gillespie | G10L 15/22 |
| 2003/0014261 A1* | 1/2003 | Kageyama | G01C 21/3608 704/275 |
| 2003/0163321 A1* | 8/2003 | Mault | A61B 5/044 704/270 |
| 2007/0124507 A1* | 5/2007 | Gurram | G06F 3/0481 710/1 |
| 2010/0280983 A1* | 11/2010 | Cho | G06F 3/0346 706/46 |
| 2011/0022393 A1* | 1/2011 | Waller | G01C 21/3608 704/270 |
| 2011/0112827 A1* | 5/2011 | Kennewick | G10L 15/18 704/9 |
| 2015/0194167 A1* | 7/2015 | Jeong | G10L 25/48 704/275 |
| 2015/0339098 A1* | 11/2015 | Lee | G06F 3/167 715/728 |
| 2015/0340033 A1* | 11/2015 | Di Fabbrizio | G10L 15/18 704/254 |
| 2016/0091967 A1* | 3/2016 | Prokofieva | G06F 3/167 345/156 |
| 2017/0068423 A1* | 3/2017 | Napolitano | G06F 3/0482 |
| 2018/0053507 A1* | 2/2018 | Wang | G10L 15/22 |
| 2019/0206405 A1* | 7/2019 | Gillespie | G06F 17/278 |

* cited by examiner

CONTEXTUAL ENTITY RESOLUTION

CROSS-REFERENCE TO RELATED APPLICATION

This application is a continuation of, and claims the benefit of priority of, U.S. Non-provisional patent application Ser. No. 15/394,753, filed on Dec. 29, 2016, and entitled "CONTEXTUAL ENTITY RESOLUTION," scheduled to issue on Mar. 12, 2019 as U.S. Pat. No. 10,229,680, the contents of which is expressly incorporated herein by reference in its entirety.

BACKGROUND

Electronic devices, such as voice activated electronic devices, are capable of performing various functionalities. For instance, an individual speaks a command to activate such a device and in response, the device may perform various functions. Some voice activated electronic device may also include displays capable of outputting content.

DETAILED DESCRIPTION

Figure 1:
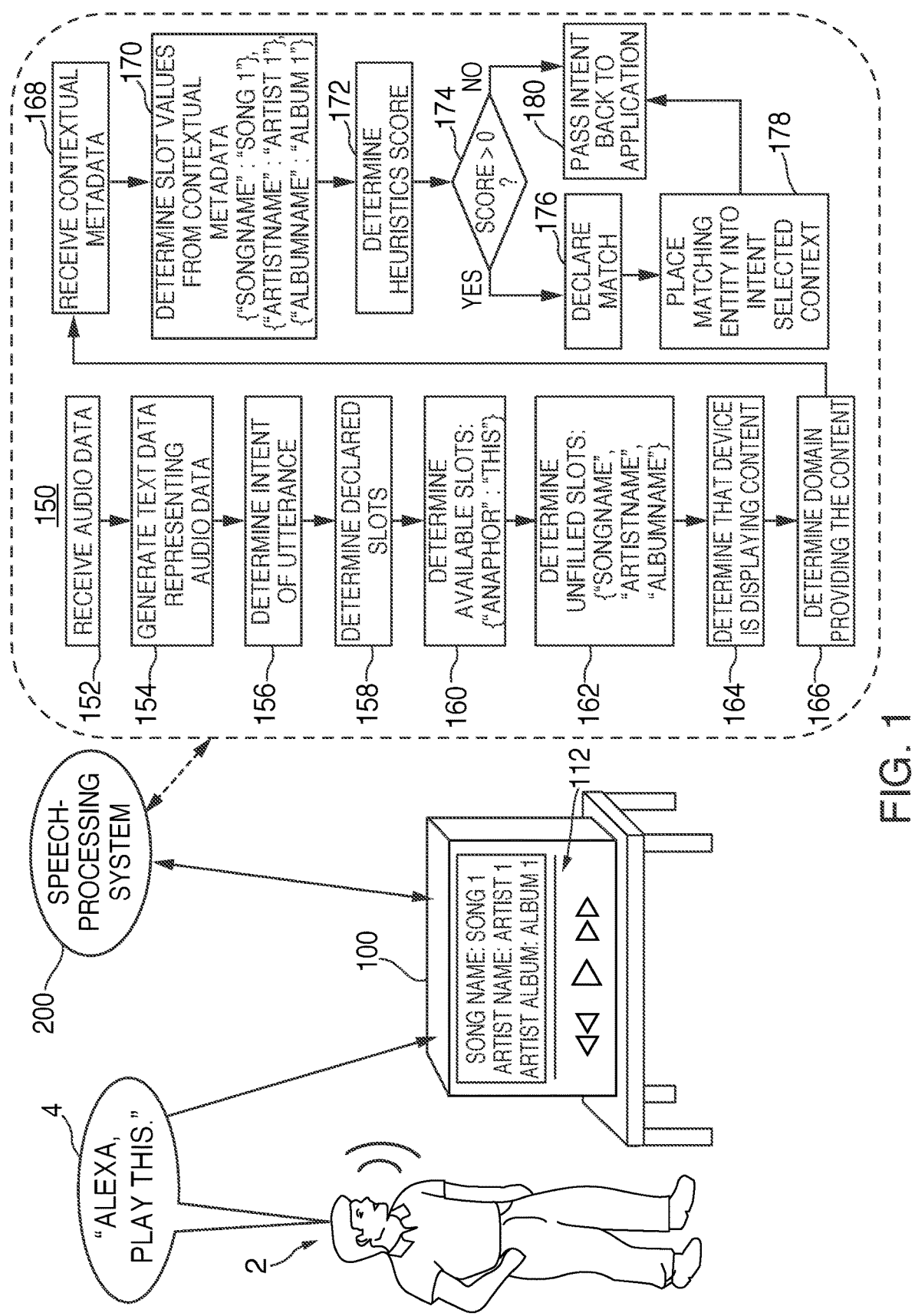
FIG. 1 is an illustrative diagram of an exemplary system for using information associated with displayed content for anaphora resolution, in accordance with various embodiments.

The present disclosure, as set forth below, is generally directed to various embodiments of methods and systems for performing contextual resolution using contextual metadata. In some embodiments, an individual may be capable of viewing content, such as a song, to-do list, and/or webpage, on a display screen of their electronic device. While the content is being displayed, the individual may speak an utterance prefaced by a wakeword, and the electronic device may be configured to send audio data representing that utterance, as well as a notification indicating that the content is currently being displayed by the electronic device, to a speech-processing system.

In response to receiving the notification, an orchestrator of the speech-processing system may send a request to a multi-domain functionality system that inquires which domain is currently responsible for providing the displayed content to the electronic device. After determining the particular domain, the orchestrator may receive or otherwise cause the natural language understanding system to receive contextual metadata representing content displayed on the client device by the domain.

In some embodiments, the domain may, upon receiving the request, format the contextual metadata such that orchestrator's requested text or other data is capable of being used as an input by natural language understanding processing components. For instance, each domain may include a speechlet or other component that has formatting logic configured to format the text, or other data, into domain specific intents, slots, and/or any other type of values that may be associated with those intents/slots. For example, if a song is being displayed by the electronic device, then a music domain may be responsible for the content displayed by the client device. The music domain may format the text representative of the displayed content such that the contextual metadata indicates a "Song Name" slot, an "Artist Name" slot, and an "Album Name" slot, and values that may be attributed to the slots. After the contextual metadata has been generated, it may be sent to the orchestrator, which may provide the contextual metadata to a natural language understanding system of the speech-processing system.

In a non-limiting embodiment, audio data representing an utterance may be received by the speech-processing system. Using automatic speech recognition processing, text data representing the audio data may be generated. The text data may then be provided to the natural language understanding system, which may attempt to resolve an intent of the utterance based, at least in part, on the text data.

The natural language understanding system may, in some embodiments, determine a likely intent, or intents, that the utterance may correspond to using on one or more language models associated with various domains accessible by the speech-processing system. Different intents may be associated with different domains, or topical categories, and each intent may include one or more slots, which may also be referred to as fillable slots, declared slots, and/or fields, that may have a corresponding value associated with them. For example, if an individual says, "Alexa, buy this," the intent of this utterance may be related to a shopping domain, and the intent may be for purchasing of an item. The "purchasing an item" intent may include various slots that may be resolved based, in one embodiment, on entity data requested by the orchestrator. For example, the "purchasing an item" intent may include one or more slots comprising, but not limited to, an "Item Name" slot, an "Anaphoric Term" slot, a "List Position" slot, a "List Name" slot, a "Product Type" slot, and/or a "Quantity" slot. Using the text data, the natural language understanding system may be capable of determining values associated with one or more of these slots, and may also be capable of "filling-in" the one or more slots with their associated value. As an illustrative example, for the utterance, "Alexa, add this to my cart," the word "this" may be resolved as a value for the "Anaphoric Term" slot, and the output from the natural language understanding system may include the value "this" being associated with the "Anaphoric Term" slot.

In a non-limiting embodiment, a heuristics score may be determined, where the heuristics score indicates a number of matching slots between the declared slots of the intent, and the slots from the contextual metadata. For example, if the intent is determined to be a "Play Music" intent, then some of the declared slots may be a "Song Name" slot, an "Artist Name" slot, and/or an "Album Name" slot. If a single item list of a particular song being played by the electronic device is displayed on a display screen of the device, then the "Music" domain may be responsible for providing the single item list. The contextual metadata provided from the "Music" domain may include text corresponding to the displayed content that has been formatted to indicate values associated with slots of the "Music" domain. For example, the "Music" domain may format the contextual metadata such that the text includes such slots as the "Song Name" slot, the "Artist Name" slot, and/or the "Album Name" slot, and the like, as well as values that may be attributed to these slots. In the illustrative example, both the intent and contextual metadata include the "Song Name" slot, the "Artist Name" slot, and/or the "Album Name" slot, and therefore the heuristics score may correspond to three (e.g., 3).

If the heuristics score is greater than zero (e.g., 0), then the matching entities may be placed into an intent selected context. For example, output data from the natural language understanding system may include the resolved entities from the text data, if available, and may also include selected context data that includes entities and values associated with those entities from the contextual metadata. This output data may then be provided back to the orchestrator, which may be configured to pass the output data to a corresponding application (or applications) associated with the identified domain. As an illustrative example, a music player application may be provided with output data including the "Play Music" intent and the selected context. For instance, the "Play Music" intent may include a value (e.g., "this") associated with the "Anaphoric Term" slot, while the selected context may include the "Song Name" slot, an "Artist Name" slot, and an "Album Name" slot, having a first value (e.g., "Song 1"), a second value (e.g., "Artist 1"), and a third value (e.g., "Album 1") associated therewith, respectively. The music player application may then be capable of using the output data to determine an appropriate song to cause to be output by the electronic device.

The contextual metadata may, in some embodiments, be structured such that it indicates various properties associated with rendered content. For example, the contextual metadata may indicate an item name of an item being displayed, an identifier unique to the item, information corresponding to one or more background functions (e.g., background music), and/or any other suitable piece of information. The contextual metadata may be configured such that the information associated with the content is organized in various slots/fields including corresponding values. These slots/fields may, for instance, be of a same or type as some or all of the slots/fields associated with one or more intents.

In some embodiments, an electronic device, such as those described previously, may be a sound controlled electronic device. A sound controlled electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device is one type of sound controlled electronic device. In response to determining that a wakeword has been uttered, the voice activated electronic device may, in some embodiments, send the audio data representing a spoken utterance subsequently following the wakeword to a speech-processing system for processing and analyzing the audio data. The speech-processing system may then generate and send a response to the voice activated electronic device, as well as, or alternatively, communicate with one or more additional systems for obtaining content to be rendered by the voice activated electronic device, and/or may cause one or more additional electronic devices to output content and/or perform a particular action (e.g., turn on a light, preheat an oven, etc.). Additionally, the voice activated electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the speech-processing system.

Spoken voice commands, in some embodiments, may be prefaced by a wakeword, which may also be referred to as a trigger expression, wake expression, or activation word. In response to detecting the wakeword being uttered, a voice activated electronic device may be configured to detect and interpret any words that subsequently follow the detected wakeword as actionable inputs or commands. In some embodiments, the voice activated electronic device may be activated by a phrase or grouping of words, which the voice activated device may also be configured to detect. The voice activated device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music," or "Alexa—Buy that." Further still, an utterance, which need not include the wakeword, may be, "Turn up the volume" or "Call mom."

Another type of sound controlled electronic device may be a sound activated electronic device. Such sound activated electronic device may function similarly to voice activated electronic devices, except that, for sound activated electronic devices, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, the electronic device may additionally, or alternatively, correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual. In some embodiments, a sound controlled electronic device (e.g., a voice activated electronic device and/or a sound activated electronic device) may include manual activated functionality such that an individual may interact with the device using voice (e.g., speech prefaced by a wakeword), sound (e.g., a particular trigger sound), and/or a manual input (e.g., a button press, a touch of a screen, etc.). However, in some embodiments, an electronic device may be configured to include a single activation functionality (e.g., only voice activated, or only manually activated).

FIG. 1 is an illustrative diagram of an exemplary system for using information associated with displayed content for anaphora resolution, in accordance with various embodiments. In the non-limiting embodiment, an individual 2 may speak an utterance 4 to a voice activated electronic device 100. Voice activated electronic device 100 may include a display screen 112, which may, in one embodiment, have a graphical user interface ("GUI") including a list of a single song, or a detail web page of one song, displayed thereon. For example, the GUI may include information associated with a song that may capable of being played, such as a song name: "Song 1," an artist name: "Artist 1," and an album name: "Album 1."

In one embodiment, voice activated electronic device 100 may determine that a wakeword (e.g., "Alexa") was uttered and/or may determine that any other type of trigger (e.g., a button being pressed) was activated and, in response, may package and send audio data representing utterance 4 to speech-processing system 200. In one embodiment, voice activated electronic device 100 may be configured to send a notification to speech-processing system 200 at a substantially same time as the audio data. The notification may indicate whether or not content is currently being displayed by display screen 112 at, or substantially at, a time that the wakeword was uttered and/or when the audio data was sent. For example, the notification may be a logical 1 or 0, where receipt of the logical 1 may indicate that content is currently being rendered by display screen 112, and the logical 0 may indicate that no content is currently being rendered by display screen 112. However, in some embodiments, voice activated electronic device 100 may alternatively be configured to package and send contextual metadata representing text or other data corresponding to the content rendered on display screen 112 to speech-processing system 200 along with the audio data representing utterance 4, in response to the audio data being sent, or in response to the wakeword being uttered.

In some embodiments, one or more components or systems of speech-processing system 200 may perform exemplary process 150. Process 150 may begin at step 152. At step 152, audio data may be received by speech-processing system 200. For example, audio data representing utterance 4 may be received by speech-processing system 200 from voice activated electronic device 100. At step 154, text data representing the audio data may be generated. In one embodiment, the audio data may be provided to an automatic speech recognition system upon receipt by speech-processing system 200, and the automatic speech recognition system may employ speech-to-text processing to generate text data representing the audio data.

At step 156, an intent of the utterance may be determined. In one embodiment, the text data may be provided to a natural language understanding system which may employ natural language understanding processing to determine an intent of the utterance based on the text data that was generated. For example, utterance 4—"Alexa, play this"—may correspond to an intent to cause a music application to begin outputting sounds associated with a particular song. In some embodiments, the text data may be compared with various language models associated with different domains, or categories, of the natural language understanding system to determine an intent that is most likely associated with the utterance. For instance, utterance 4 may include words (e.g., "play") that may correspond to one or more different domains, such as a music domain, a video domain, an electronic book reader domain, and the like. Each of these domains may include language models that may be used to determine an intent for utterance 4. For example, the music domain may include the word "play" corresponding to a play music intent, and the word "this" corresponds to an anaphoric term. As another example, the utterance "Add this to my cart" may correspond to a shopping intent, where the word "add" corresponds to a purchasing intent, the word "this" may correspond to an anaphoric term, and the word "cart" may correspond to a list type term.

At step 158, one or more declared slots, which may also be referred to as fields, may be determined for the intent or intents determined to correspond to the utterance. For example, a play music intent may include such declared slots as: "Application Data" slot, "Song Name" slot, "Album Name" slot, "Artist Name" slot, "Genre Name" slot, "Playlist Name" slot, "Media Type" slot, "Sort Type" slot, "Play Mode" slot, "Service Name" slot, "Anaphor" slot, "List Position" slot, "Recommended Trigger" slot, and/or "Similar Trigger" slot. Each of these slots may be capable of being used to describe a particular entity that the intent "play" is associated with. For example, each declared slot of an intent may be a feature that may be used to describe the entity that an action is associated with, where the action may be identifiable from a spoken utterance, as well as contextual information. In some embodiments, intents associated with different domains may have different declared slots. For example, an intent corresponding to adding an item to one's shopping cart (e.g., "Alexa, Add this to my cart") may include such declared slots as: "Application Data" slot, "Item Name" slot, "Anaphor" slot, "List Position" slot, "List Name" slot, "List Type" slot, "Product Sort Type" slot, "Service Name" slot, and/or a "Quantity" slot. In some embodiments, some declared slots may be included for all intents. For example, "List Position" slot may be included in all intents.

At step 160, available slots, or in other words, slots that have a value associated with them, may be determined. The available slots may be determined, in one embodiment, based on the text data being analyzed by the natural language understanding processing. For example, natural language understanding processing may be able to determine that utterance 4 corresponds to a "Play Music" intent including an "Anaphoric Term" slot having a value "this" associated with it. However, other declared slots associated with the "Play Music" intent may remain unfilled or otherwise have no values determined to be associated with them.

At step 162, the unfilled slots associated with the identified intent may be determined. Continuing the previous example, the "Play Music" intent may include a "Song Name" slot, an "Artist Name" slot, and an "Album Name" slot, amongst other declared slots associated with the "Play Music" intent. However, because natural language understanding processing was only able to identify the "Anaphoric Term" slot being associated with the value "this," other declared slots corresponding to the "Play Music" intent may remain unfilled. Persons of ordinary skill in the art will recognize that, in some embodiments, step 162 may be optional in that once the available slots are determined, the unfilled slots may be known.

In some embodiments, speech-processing system 200 may be unable to identify, or resolve, the entity that utterance 4 corresponds to based, at least in part, on the lack of filled declared slots associated with the particular intent. For example, speech-processing system 200 may be unable to determine what song "this" refers to using only the text data provided to natural language understanding processing from automatic speech generation processing. This may cause speech-processing system 200 to prompt individual 2 for additional information related to their request so as to determine an appropriate action, or actions, to occur in response. However, this may result in a poor user experience as the individual (e.g., individual 2) may not be able to simply have their request executed quickly and efficiently. To assist in avoiding such potential additional interactions from occurring, contextual information related to content being rendered by display 112 of voice activated electronic device 100 at the time that utterance 4 was spoken may be used to assist in resolving the action. The contextual information about the displayed content may be capable of being harnessed by an application and/or domain to assist in resolving one or more of the remaining unfilled declared slots.

At step 164, a determination may be made that the device is currently displaying content. For example, at substantially a same time as when the wakeword was uttered, or at a substantially same time as when the audio data representing utterance 4 was sent to speech-processing system 200, voice activated electronic device 100 may be configured to determine to determine whether or not content is currently being rendered by display screen 112. If so, then voice activated electronic device 100 may send a notification (e.g., a flag) that indicates that, at that particular time (e.g., when the utterance was spoken, when the audio data was sent, etc.), content was currently being displayed by display 112. For example, voice activated electronic device 100 may send content displayed flag having a logical 1 or TRUE value that indicates that content is being displayed. If no content were being displayed by display screen 112, then voice activated electronic device 100 may, alternatively, send a content displayed flag having a logical 0 or FALSE value, indicating that no content is being displayed. Furthermore, in some embodiments, if no content is being displayed, voice activated electronic device 100 may be configured to not send any flag or other notification to speech-processing system 200. In some embodiments, however, a wakeword may not be uttered, and instead a button or other manual input may be detected that causes electronic device 100 to begin packing and sending audio data to speech-processing system 200. In this particular scenario, the determination of whether or not content is currently being rendered by electronic device 100 may occur in response to the manual input.

At step 166, a domain currently responsible for providing the content that is being displayed by display screen 112 may be determined. For example, upon receiving the notification indicating that voice activated electronic device 100 is displayed content, an orchestrator component of speech-processing system 200 may generate and send a request to each domain associated with speech-processing system 200. The request may inquire as to which domain is responsible for providing the rendered content to voice activated electronic device 100. The responsible domain may then indicate to the orchestrator that they are the domain currently being used for rendering the displayed content, and therefore the orchestrator may request contextual metadata representing the displayed content, such as text or other data which may be capable of being used as an input for natural language understanding processing components. In some embodiments, the domain may automatically generate and send the contextual metadata in response to the orchestrator requesting that the responsible domain identify itself, however persons of ordinary skill in the art will recognize that this is merely exemplary.

In some embodiments, the domains and/or applications may include formatting logic (e.g., a speechlet) that is configured to format the contextual metadata representing the displayed content to conform with that domain's identified intents. The domains/applications may be configured to format the contextual metadata such that the slot names included by the contextual metadata precisely match to the slot names as they are referred to by natural language understanding processing. The domains and/or applications may include logic configured to take the text and/or other data corresponding to the content displayed on display screen 112, and organize the text such that slots associated with that domain's intents, and values attributed to those slots, are identified. For example, if the displayed content includes a song name, an artist name, and an album name of a single item song list, then the music application responsible for providing the displayed content may format the contextual metadata such that it includes slots such as "Song Name," "Artist Name," and "Album Name," which are the same slots as the declared slots associated with the music domain. After formatting the text into identified slots and values that may be attributed to those slots based on the content, the domain may generate the contextual metadata representing the content, and may provide the contextual metadata to the natural language understanding processing. In some embodiments, mapping between attributes having different identifiers between natural language understanding processing and contextual resolution processing may be included. For example, a shopping intent, associated with a shopping domain, may include a declared "Item Name" slot, whereas a shopping application responsible for providing displayed content may be configured to call a similar attribute a "Product Title" slot. Therefore, mapping logic may be included by the contextual resolution system that allows for the "Product Title" slot to be mapped to the "Item Name" slot.

At step 168, the contextual metadata may be received at the natural language understanding system. In one embodiment, the orchestrator may receive or otherwise cause the natural language understanding system to receive the contextual metadata. For example, a contextual resolution component of the natural language understanding system may receive the contextual metadata from the orchestrator upon receipt from the domain. As mentioned previously, the contextual metadata may, in some embodiments, be formatted so that each item displayed by display screen 112 is capable of being identified, and includes a corresponding value.

At step 170, slot values may be determined from the contextual metadata that was received for one or more of the unfilled declared slots. Speech-processing system 200 may, in one embodiment, determine that one or more of the contextual slot values correspond to a same, or may be substantially equivalent to one or more of the unfilled declared slots. As an illustrative example, the "Play Music" intent may include the unfilled declared slots: "Song Name" slot, "Artist Name" slot, and "Album Name" slot. Furthermore, the contextual metadata received for the rendered content of voice activated electronic device 100 may include a "Song Name" slot, an "Artist Name" slot, and an "Album Name" slot.

At step 172, a heuristics score may be determined, where the heuristics score may indicate a number of matching entities from the contextual metadata and the declared slots from the intent. For example, in the abovementioned case, if the "Song Name" slot, the "Artist Name" slot, and the "Album Name" slot are attributes characterized by the contextual metadata and for the "Play Music" intent. Therefore, in this particular scenario, the heuristics score would be three (e.g., "3"). As another example, if the "Song Name" slot, the "Artist Name" slot, and the "Album Name" slot were included for the contextual metadata, but the intent of the utterance corresponds to an "Add Item To Shopping Cart" intent, then the heuristics score may be zero (e.g., "0"), indicating that there are no matching entities between the intent and the contextual metadata.

At step 174, a determination may be made as to whether or not the heuristics score is greater than zero (e.g., "0"). If so, then process 150 may proceed to step 176, where a match between the one or more contextual slots and the unfilled declared slots may be declared. At step 178, the matching entity or entities may be placed into an intent selected context. For example, the values of "Song 1," "Artist 1," and "Album 1" for the slots "Song Name" slot, "Artist Name" slot, and "Album Name" may be placed into a selected context. At step 180, output data may be generated including the selected context, and the output data may be sent to the application identified by the natural language understanding processing for performing one or more actions. The output data may include the declared slots and the values filled in for any of the declared slots obtained by the natural language understanding processing using the text data, and the output data may also include the selected context data including the matching slots and the attributed values for those slots obtained from the contextual metadata. This output data may be passed back to the application (e.g., music player application, shopping application, etc.) such that the application may cause an appropriate action, or actions, to be performed.

If, at step 174, is determined that the heuristics score is not greater than zero, then process 150 may proceed to step 180. In this particular scenario, the intent may be passed back to the application, where the intent may include the declared slots, and the filled-in values for those slots, from the natural language understanding processing that was performed. The contextual metadata, in this embodiment, may not be included in the content provided to the application, as no matching entities were found. However, persons of ordinary skill in the art will recognize that in some embodiments, the contextual metadata may still be provided to the application even if the heuristics score is zero. The application may then cause a certain action to be performed by voice activated electronic device 100 in an attempt to resolve any entities from the declared slots that may be still be needed. For example, voice activated electronic device 100 may be caused to output a message requesting more information, such as, "I did not understand," or "Please say that again." In some embodiments, instead of passing the intent back to the application, an output may be generated including only the filled declared slots from the natural language understanding processing, and a domain ranking may occur to determine if any domains are capable of servicing the request based on the available information.

In some embodiments, list resolution may be performed in addition to anaphora resolution by leveraging one or more of the filled declared slots. For example, if one of the filled slots (e.g., "Song Name" slot) matches one of the contextual slots for the play music intent, then this information may be leveraged by natural language understanding processing to produce one (or more) matched entities in the selected context output. Persons of ordinary skill in the art will recognize that anaphora resolution and/or list resolution may be employed using the contextual metadata, and the aforementioned is merely exemplary.

In some embodiments, the matching of entities from the contextual slots and the declared slots may leverage the value associated with the contextual slot and the value of the declared slot in one of two ways: for list position resolution, and for list entity resolution. For list position resolution, when an individual indicates that he/she wants to act on an item at a particular position (e.g., "Buy number three"), the list position slot may be tagged. If a contextual entity was passed specifying its list position as three, then this would be put on the output. For list entity resolution, for example, if an individual says, "Buy the coffee maker," and there is a list of products specifying item names (e.g., Item 1: {Item Name}: "Coffee Maker," Item 2: {Item Name}: "Espresso Maker," Item 3: {Item Name}: "Bread Maker"), then a search may be performed against the list of products to determine which one the individual wants to purchase.

Figure 2A:
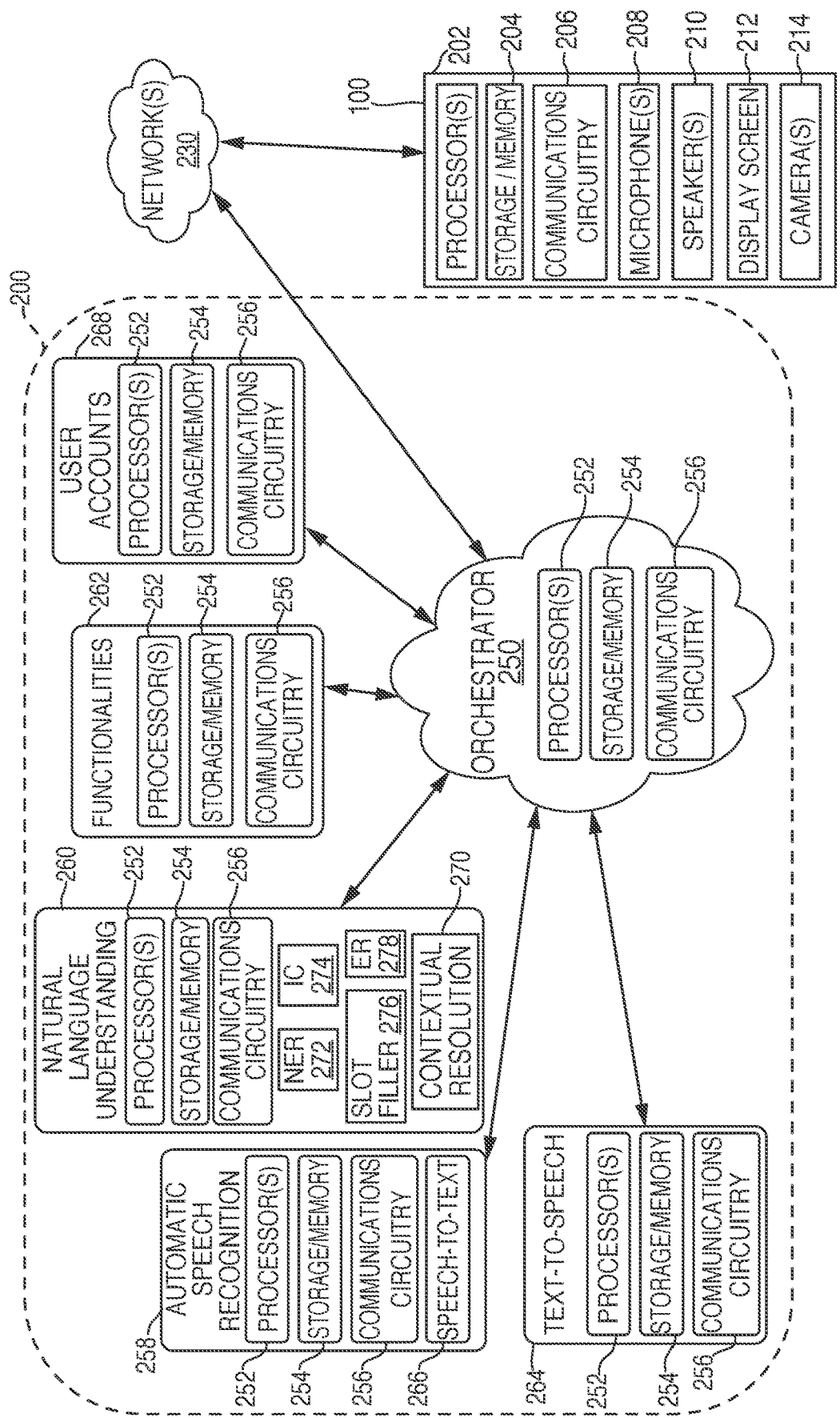
FIG. 2A is an illustrative diagram of the system architecture of FIG. 1, in accordance with various embodiments.

FIG. 2A is an illustrative diagram of the system architecture of FIG. 1, in accordance with various embodiments. Electronic device 100 may, in some embodiments, include sound controlled functionality, such as one or more voice and/or sound activated components. In some embodiments, electronic device 100 may be configured to communicate with speech-processing system 200 in response to detecting an utterance including a wakeword, which may subsequently be followed by a request/question/statement. Similarly, electronic device 100 may alternatively or additionally include one or more manually activated components for manually activating electronic device 100. In this particular scenario, electronic device 100 may also be configured, in one embodiment, to communicate with speech-processing system 200 in response to a manual input being detected by one or more input mechanisms, such as a touch screen, a button, and/or a switch, for example.

In a non-limiting embodiment, electronic device 100 may be capable of being activated in response to detecting a specific sound, such as a wakeword, as well as, or alternatively, via one or more inputs. After detecting a specific sound (e.g., a wakeword or trigger expression), electronic device 100 may recognize commands (e.g., audible commands, inputs) within captured audio, and may perform one or more actions in response to the received commands. Furthermore, electronic device 100 may also be configured to perform one or more actions in response to detecting a particular touch, or mechanical, input(s) via electronic device 100.

Electronic device 100 may correspond to any suitable type of electronic device including, but are not limited to, desktop computers, mobile computers (e.g., laptops, ultra-books), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, electronic device 100 may be relatively simple or basic in structure such that no, or a minimal number of, mechanical input option(s) (e.g., keyboard, mouse, track pad) or touch input(s) (e.g., touch screen, buttons) are included. For example, electronic device 100 may be able to receive and output audio, and may include power, processing capabilities, storage/memory capabilities, and communication capabilities. However, in other embodiments, electronic device 100 may include one or more components for receiving mechanical inputs or touch inputs, such as a touch screen and/or one or more buttons.

Electronic device 100, in one embodiment, may include a minimal number of input mechanisms (e.g., a power on/off switch) such that functionality of electronic device 100 may solely or primarily be through audio input and audio output. For example, electronic device 100 may include, or be in communication with, one or more microphones that listen for a wakeword by continually monitoring local audio. In response to the wakeword being detected, electronic device 100 may establish a connection with speech-processing system 200, send audio data to speech-processing system 200, and await/receive a response from speech-processing system 200. In some embodiments, however, non-voice/sound activated devices may also communicate with speech-processing system 200. For example, in response to a button or touch screen being pressed, or a button or touch screen being pressed and held, a microphone associated with electronic device 100 may begin recording local audio, establish a connection with speech-processing system 200, send audio data representing the captured audio to speech-processing system 200, and await/receive a response, and/or action to be occur, from speech-processing system 200.

Persons of ordinary skill in the art will recognize that speech-processing system 200 may be located within a dedicated computing device or computing system, which may or may not be in communication with one or more additional devices. For instance, speech-processing system 200 may be located on a remote computing system with which an individual subscribes to a service on. However, speech-processing system 200 may also be included within a computing system locally stored or owned by an individual.

Electronic device 100 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within electronic device 100, and/or one or more components may be omitted. For example, electronic device 100 may also include a power supply or a bus connector. As still yet another example, electronic device 100 may include one or more additional input and/or output mechanisms, such as one or more buttons, or one or more switches or knobs. Furthermore, while electronic device 100 may include multiple instances of one or more components, for simplicity only one of each component has been shown.

In some embodiments, electronic device 100 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, electronic device 100 may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100 may include one or more microphone(s) 208. These microphone(s) 208 may receive audio input signals, and electronic device may determine whether or not the audio input signals indicate that a wakeword was uttered. If so, then electronic device may cause audio data representing an utterance including the wakeword, or spoken after the wakeword, to be sent to speech-processing system 200.

Processor(s) 202 may include any suitable processing circuitry capable of controlling operations and functionality of electronic device 100, as well as facilitating communications between various components within electronic device 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100.

Storage/memory 204 may include one or more types of storage mediums such as any volatile or non-volatile memory, or any removable or non-removable memory implemented in any suitable manner to store data for electronic device 100. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic devices 100 and speech-processing system 200. For example, the media system may store one or more communications protocols that may be executed by processor(s) 202 for facilitating communications for device 100. In some embodiments, a sessions initiation protocol ("SIP") may be used to facilitate media transfer between electronic device 100 and one or more of speech-processing system 200 and another electronic device 100. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device 100. In some embodiments, a Web Real-Time Communications ("WebRTC") protocols may be employed by electronic device 100. In a non-limiting embodiment, the media system may include instructions that indicate which communications protocols to employ for facilitating media transfer between devices based on a device type of electronic device 100. For example, if electronic device 100 does not include display 212 and/or camera 214, then the media system may indicate that PJSIP should be used, whereas if electronic device 100 includes display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by speaker(s) 210, and/or a speech-to-text ("STT") component capable of converting received audio signals into text to be sent to speech-processing system for processing.

The wakeword database may be a database stored locally by storage/memory 204 of electronic device 100, and may include a list of a current wakeword for electronic device 100, as well as one or more previously used, or alternative, wakewords for voice activated electronic device. In some embodiments, an individual may set or program a wakeword for their electronic device 100. The wakeword may be programmed directly on electronic device 100, or a wakeword or wakewords may be set by the individual via a local client application that is in communication with speech-processing system 200. For example, an individual may use their mobile device having the speech-processing system application running thereon to set the wakeword. The specific wakeword may then be communicated from the mobile device to speech-processing system 200, which in turn may send/notify electronic device 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally, a portion of an audio signal is analyzed by comparing its MINI model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100 may then begin transmitting the audio signal to speech-processing system 200 for detecting and responds to subsequent utterances made by an individual.

In some embodiments, storage/memory 204 may store voice biometric data associated with one or more individuals. For example, an individual that operates electronic device 100 may have a registered user account on speech-processing system 200 (e.g., within accounts system 268). In some embodiments, electronic device 100 may be associated with a group account, and various individuals may have user accounts that are operating under the rules and configurations of the group account. As an illustrative example, electronic device 100 may be associated with a first group account on speech-processing system 200, the first group account being for a family that lives at a household where electronic device 100 is located. Each family member may also have a user account that is linked to the first group account (e.g., a parent, a child, etc.), and therefore each user account may obtain some or all of the rights of the first group account. For example, electronic device 100 may have a first group account on speech-processing system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Communications circuitry 206 may include any circuitry allowing or enabling one or more components of electronic device 100 to communicate with one another, and/or with one or more additional devices, servers, and/or systems. For example, communications circuitry 206 may facilitate communications between electronic device 100 and speech-processing system 200. As an illustrative example, audio data representing an utterance (e.g., utterance 4 of FIG. 1) may be transmitted over a network 230, such as the Internet, to speech-processing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100 and speech-processing system 200. In some embodiments, electronic device 100 and speech-processing system 200 may communicate with one another via a web browser using HTTP. Various additional communication protocols may be used to facilitate communications between electronic device 100 and speech-processing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 100 may include one or more antennas to facilitate wireless communications with a network using various wireless technologies (e.g., Wi-Fi, Bluetooth, radiofrequency, etc.). In yet another embodiment, electronic device 100 may include one or more universal serial bus ("USB") ports, one or more Ethernet or broadband ports, and/or any other type of hardwire access port so that communications circuitry 206 allows electronic device 100 to communicate with one or more communications networks.

Electronic device 100 may also include one or more microphones 208 and/or transducers. Furthermore, one or more microphones located within a separate device may be in communication with electronic device 100 to capture sounds for electronic device 100. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100 may include multiple microphones (e.g., four, seven, ten, etc.) placed at various positions about electronic device 100 to monitor/capture any audio outputted in the environment where electronic device 100 is located. The various microphones 208 may include some microphones optimized for distant sounds, while some microphones may be optimized for sounds occurring within a close range of electronic device 100. In some embodiments, microphone(s) 208 may only begin to detect audio signals in response to a manual input to electronic device 100. For example, a manually activated device may begin to capture audio data using microphone(s) 208 in response to a user input, such as pressing a button, tapping a touch screen, or providing any touch input gesture to a touch input component.

Electronic device 100 may include one or more speakers 210. Furthermore, electronic device 100 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device 100 may be located. In some embodiments, speaker(s) 210 may include headphones or ear buds, which may be wirelessly wired, or hard-wired, to electronic device 100, that may be capable of broadcasting audio directly to an individual.

In some embodiments, one or more microphones 208 may serve as input devices to receive audio inputs. Electronic device 100, in the previously mentioned embodiment, may then also include one or more speakers 210 to output audible responses. In this manner, electronic device 100 may function solely through speech or audio, without the use or need for any input mechanisms or displays, however this is merely exemplary.

Display screen 212 may correspond to a display device and/or touch screen, which may be any size and/or shape and may be located at any portion of electronic device 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100. For instance, electronic device 100 may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100 may be configured to determine which pixels are associated with a particular location point, and which item or items are also displayed at that pixel location. Furthermore, electronic device 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra displays.

In some embodiments, content displayed on display screen 212 may be formatted such that contextual entities and lists are able to be analyzed by speech-processing system 200 for list resolution and/or anaphora resolution. Context related to the displayed content may include entities associated with electronic device 100 including, but not limited to, foreground entities (e.g., lists of items, detail pages), background entities (e.g., songs, audio books), and notification entities. The contextual metadata may be structured into context entity slots, list metadata, and any other additional data available. For example, contextual entity slots may correspond to data used for list resolution and/or anaphora resolution. The contextual entity slots may be specified in domain definitions with corresponding values. The list metadata may include list identifiers, item identifiers for items of a list, and absolute positions of the list for a particular item (e.g., a first item of a list, a second item of a list, etc.). Such additional data may include unique identifiers associated with an object, item prices, quantities, and the like.

In some embodiments, electronic device 100 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100 may include multiple cameras 214, such as one or more front-facing cameras and/or one or more rear facing cameras. Furthermore, camera(s) 214 may be configured to recognize far-field imagery (e.g., objects located at a large distance away from electronic device 100) or near-filed imagery (e.g., objected located at a relatively small distance from electronic device 100). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100. For instance, camera(s) 214 may be external to, and in communication with, electronic device 100. For example, an external camera may be capable of capturing images and/or video, which may then be provided to electronic device 100 for viewing and/or processing.

Persons of ordinary skill in the art will recognize that, in some embodiments, display screen 212 and/or camera(s) 214 may be optional for electronic device 100. For instance, electronic device 100 may function using audio inputs, and outputting audio in response or causing one or more actions to occur in response, and therefore display screen 212 and/or camera(s) 214 may not be included. Furthermore, in some embodiments, electronic device 100 may not include display screen 212 and/or camera(s) 214, but instead may be in communication with display screen 212 and/or camera(s) 214. For example, electronic device 100 may be connected to a display screen via a Wi-Fi (e.g., 802.11 protocol) connection such that visual content sent to electronic device 100 may be sent to the display screen, and output thereby.

In one exemplary embodiment, electronic device 100 may include an additional input/output ("I/O") interface. For example, electronic device 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100 may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100. For example, one or more LED lights may be included on electronic device 100 such that, when microphone(s) 208 receive audio, the one or more LED lights become illuminated signifying that audio has been received by electronic device 100. In some embodiments, one or more vibrating mechanisms or other haptic features may be included with electronic device 100 to provide a haptic response to an individual.

In some embodiments, electronic device 100 may include radio-frequency identification ("RFID") functionality and/or near field communication ("NFC") functionality. Furthermore, in some embodiments, electronic device 100 may include one or more infrared ("IR") sensors and one or more IR emitters. The IR sensors/emitters may be used to determine depth information. For example, in one embodiment, a distance of an individual from electronic device 100 may be determined using the one or more IR sensors/emitters. Depth determination may be performed using any depth determination technique. In some embodiments, a distance between an individual and electronic device 100 may be employed as a basis for presenting content with varying density using display screen 212. In some embodiments, electronic device 100 may include beaconing functionality that allows electronic device 100 to recognize when one or more devices are located nearby. For example, electronic device 100 may include beaconing detection functionality that generates a beaconing signal, and attempts to determine whether any devices nearby are capable of detecting that signal. If so, then that may indicate that a particular device is proximate to electronic device 100.

In some embodiments, contextual metadata may be obtained by computer vision analysis of an object detected by camera(s) 214. For example, in response to speaking the utterance, "Buy this," electronic device 100 may cause camera(s) 214 to capture an image. That image may be analyzed to determine what the object is, and the contextual metadata associated with that objects identify may be determined. For instance, if an individual is holding up a bottle of ketchup, then the computer vision analysis may be able to determine a product name, bar code, and/or any other attribute about the bottle of ketchup from the captured image, and may populate a contextual metadata structure indicating the determined values (e.g., 'Item Name' slot: "Ketchup").

Speech-processing system 200 may include various components and modules including, but not limited to, automatic speech recognition ("ASR") system 258, natural language understanding ("NLU") system 260, functionalities system 262, text-to-speech ("TTS") module 264, and user accounts system 268. In some embodiments, speech-processing system 200 may also include an orchestrator system 250 capable of orchestrating one or more processes to be performed by one or more of ASR system 258, NLU system 260, functionalities system 262, TTS system 264, and/or user accounts system 268, as well as one or more additional components, devices, and/or systems associated therewith. Speech-processing system 200 may also include computer readable media, including, but not limited to, flash memory, random access memory ("RAM"), and/or read-only memory ("ROM"). Speech-processing system 200 may also include various modules that store software, hardware, logic, instructions, and/or commands for speech-processing system 200, such as a speaker identification ("ID") module, or any other module, or any combination thereof.

ASR system 258 may be configured to recognize human speech in detected audio, such as audio captured by electronic device 100, which may then be transmitted to speech-processing system 200. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR system 258 may include speech-to-text ("STT") system 266. STT system 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by speech-processing system 200, such as the expression detector mentioned above with regards to electronic device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that a particular word or phrase (e.g., a wakeword), is represented within the audio signal. The expression detector may then compare that score to a threshold value to determine whether that word or phrase will be declared as having been spoken.

For instance, ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 100, speech-processing system 200, or by another device, such as a separate device or server capable of performing one or more additional functionalities thereon (e.g., a television capable of outputting video content).

NLU system 260 may be configured such that it determines an intent of an utterance based on the received audio data. NLU system 260 may determine one or more domains, which may also be referred to as categories, that may be capable of handling the intent of the utterance. For example, utterance 4, "Play this," may be identified by a Music domain, an E-Book domain, and a Video domain as possibly being able to handle the corresponding request. For instance, NLU system 260 may identify that the word "Play" may be a recognized intent of each of the aforementioned domains (as well, possibly, other domains). In some embodiments, to determining an utterance's intent, NLU system 260 may communicate with functionalities system 262 to cause one or more specific functionalities to be accessible, perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

NLU system 260 may include a named entity recognition ("NER") system 272, which may be used to identify portions of text that correspond to a named entity recognizable by NLU system 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU system 260 takes textual input and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., utterance 4) as well as the pertinent pieces of information in the text that allow an action to be completed. For example, if a spoken utterance is processed by ASR system 258 and outputs the text, "call mom," NLU system 260 may determine that an intent of the utterance is to activate a telephone, or telephone functionality, and to initiate a call with a contact matching the entity "mom". In some embodiments, NLU system 260 may process several textual inputs related to the same utterance.

For example, if ASR system 258 outputs N text segments (as part of an N-best list), then NLU system 260 may process all N outputs.

As will be discussed further below, NLU system 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU system 260 may be used to provide answer data in response to queries, for example using a knowledge base stored within storage/memory 254 of NLU system 260 and/or storage/memory of speech-processing system 200.

To correctly perform natural language understanding processing of speech input, NLU system 260 may be configured to determine a domain of an utterance. By determining the domain, NLU system 260 may narrow down which services and functionalities offered by an endpoint device (e.g., electronic device 100, speech-processing system 200, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account of speech-processing system 200. Words in a single text query may implicate more than one service, and some services may be functionally linked (e.g., both a telephone service and a calendar service may utilize data from the contact list).

NER system 272 may be configured to receive a query in the form of one or more results from ASR system 258. NER system 272, which is described in greater detail within FIG. 2B, may then attempt to identify relevant grammars and lexical information that may be used to construe meaning of the one or more results. To do so, NER system 272 may begin by identifying potential domains that may relate to the received query. NLU system 260, may include a databases of devices within storage/memory 254 of NLU system 260 that may be used to identify domains associated with specific devices. For example, electronic device 100 may be associated with domains for music, telephone functionality, calendar information, contact lists, and/or device-specific communications. In addition, NLU system 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "shopping," "music," or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular user account of user accounts system 268 and/or electronic device 100. For example, a first gazetteer may include first domain-index lexical information. A user's music-domain lexical information might include album titles, artist names, and song names, for example, whereas a user's contact-list lexical information might include the names of contacts.

Since every user's music collection and contact list is presumably different, this personalized information improves entity resolution.

In some embodiments, NLU system 260 may be configured to apply the rules, models, and information applicable to each identified domain. For example, if a query potentially implicates both communications and music, the query may, substantially in parallel, the natural language understanding processing may use the grammar models and lexical information for communications, and may also use the grammar models and lexical information for music. The responses based on the query produced by each set of models is scored, with the overall highest ranked result from all applied domains is ordinarily selected to be the correct result, which is described in greater detail below with reference to FIG. 2B.

An intent classification ("IC") system 274 may parse the query to determine an intent or intents for each identified domain, where the intent corresponds to the action to be performed that is responsive to the query. Each domain is associated with a database of words linked to intents. For example, a music intent database of a music domain may link words and phrases such as "play," to a play music intent, "stop," to a stop playing music intent, and "mute" to a mute volume intent. IC system 276 may be configured to identify potential intents for each domain by comparing words in the query to the words and phrases in that domain's intents database. Traditionally, the determination of an intent by IC system 274 is performed using a set of rules or templates that are processed against the incoming text to identify a matching intent.

In order to generate a particular interpreted response, NER system 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags. As another example, if "Play 'Song 1'" is an identified intent, a grammar framework may correspond to sentence structures such as "Play {Song 1}."

NER system 272 may parse the query to identify words as subject, object, verb, preposition, etc., based on grammar rules and/or models, prior to resolving named entities. The identified verb may be used by IC module 274 to identify intent, which is then used by NER system 272 to identify frameworks. A framework for an intent of "play" may specify a list of slots/fields/placeholders applicable to place the identified "object" such as, for example, {Artist Name}, {Album Name}, {Song Name}, {Application Name}, {Anaphoric Term}, and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "Play 'Song 1' by 'Artist 1'" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 276 may determine corresponds to the "play music" intent. No determination has been made as to the meaning of "Song 1" and "Artist 1," but based on grammar rules and models, it may be determined that the text of these phrases relate to the grammatical object (i.e., entity) of the query.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer information, NER system 272 may search the database of generic words associated with the particular domain. So for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

The results of the natural language understanding processing may be tagged to attribute meaning to the query. So, for instance, "Play 'Song 1' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," {Intent}: "Play Music," {Artist Name}: "Artist 1," and {Media Type}: Song. Still further, "Add this to my cart" might produce a result of: {Domain} Shopping, {Intent} "Add item to," {Anaphoric Term}: "this," and {List Type} "cart."

The output from NLU system 260 (which may include tagged text, commands, etc.) may then be sent to orchestrator 250 and/or a command processor, which may be located on, or may be in communication with, speech-processing system 200. The destination command processor may be determined based on the output of NLU system 260. For example, if NLU system 260 outputs include a command to play music, the destination command processor may be a music playing application, such as one located on electronic device 100 or in a music playing application, configured to execute a music playing command to cause a particular audio file to output. If the output of NLU system 260, however, includes a search request, the destination command processor may include a search engine processor, such as one located on a search server, configured to execute a search command. If the output of NLU system 260 includes a request for enablement of an application's functionalities for a particular user account, then the language model for the user account may be updated to include one or more invocations, utterance frameworks, response frameworks, and values for the frameworks, for a particular application.

In some embodiments, NLU system 260 may also include an entity resolution module 278, which allows NLU system 260 to query each domain of NLU system 260 to determine which domain or domains believe that they can handle a given request. Upon performing the query, each domain of domain system 272 may return a "score" indicating a likelihood that they can handle the application in question. For instance, various domains may return scores of LOW, MEDIUM, or HIGH, indicating the likelihood that they can handle the particular application. Entity recognition module 278 may return application names or titles for the request, which may be based on relevance scores that estimate a confidence that a particular application may be best used for the request. As an illustrative example, if the utterance is, "Play my music," NLU system 260 may determine, using entity resolution module 278, which domains, and thus applications, can likely handle this request, and may select the domain and/or application having the highest confidence score as being the domain and/or application able to handle the request. Furthermore, as described in greater detail below with reference to FIG. 2B, NLU system 260 may further include a slot filler module 276.

In some embodiments, NLU system 260 may include a contextual resolution system 270, which may be a system configured to identify entities for assisting natural language understanding processing using contextual metadata corresponding to content being displayed by display screen 212. Contextual resolution system 270 may receive contextual metadata from orchestrator 250 (e.g., that may be generated and sent from a particular domain of functionalities 262) and/or from electronic device 100. The contextual metadata my include information associated with the particular content currently being rendered by a requesting device. In some embodiments, the contextual metadata may be obtained in response to receiving audio data. For example, in response to receiving audio data representing utterance 4, voice activated electronic device 100 may send a notification to speech-processing system 200 that indicates that content is currently being rendered by display screen 212.

In one embodiment, orchestrator 250 may be configured to receive the audio data, and may determine that the notification has also been received. Orchestrator 250 may determine whether or not the notification indicates that there is (or was) content displayed by display screen 212 at the time that the utterance was spoken (e.g., when the wakeword was uttered). However, persons of ordinary skill in the art will recognize that the determination of whether content is being displayed by display screen 212 may correspond to a time just prior to the wakeword being uttered, when the wakeword was uttered, after the wakeword was uttered, during the utterance being spoken, after the utterance was spoken, and/or after the audio data is sent to speech-processing system 200, and the aforementioned is merely exemplary. The notification may correspond to a flag, such as a logical I/O, where if the flag has a value of 1, then this may indicate that content is being rendered by electronic device 100, whereas if the flag has a value of 0, then this may indicate that not content is being rendered by electronic device 100.

Upon determining that electronic device 100 is rendering content (e.g., receiving a notification indicating that content is being displayed by display screen 212), orchestrator 250 may generate and send a request to the various domains associated with functionalities system 262 and NLU system 260. The request may inquire as to which domain, or domains, are currently providing electronic device 100 with content, such as the content being rendered. Upon determining that domain, or domains, that are providing content, orchestrator 250 may request that the identified domain(s) generate and send contextual metadata representing text corresponding to the displayed content. After receiving the contextual metadata from the corresponding domain(s), orchestrator 250 may provide the contextual metadata to contextual resolution system 270, or otherwise cause the contextual metadata to be sent to NLU system 260.

In some embodiments, the various domains may include formatting logic (e.g., speechlets) that may format the contextual metadata. The contextual metadata may be structured, in response to the formatting logic applying its formatting rules, such that attributes of the content are arranged in contextual slots including values associated with those slots. For instance, the contextual metadata may also be referred to, or may generally correspond to, entity data representing content being displayed by display screen 212 during a time when an utterance is spoken. For example, single item or detail web page of an item, such as a coffee maker, may include entity data organized into contextual slots such as {Item Name}, {List Position}, and {Item Identifier}. Values from the particular web page being displayed currently by display screen 212 may include: {Item Name}: "Coffee Maker," {List Position}: "1," and {Item Identifier}: "abcd1234." Different types of content may include different contextual slots. For example, lists may include {List Types}, {List Position}, {List Name}, etc.

In some embodiments, contextual resolution system 270 may determine whether any slots/fields from intent resolution processing by NLU system 260 substantially match any slots/fields from the contextual metadata received. For instance, the entity data that is received from the domain may include similar entities (e.g. slots) as the entities associated with the intent identified by NLU system 260. This may include having contextual slots from the contextual metadata being associated with similar attributes as those of slots from intent resolution by NLU system 260. As an example, the "Play Music" intent may include slots for application data—{Application Data Slot}, song name—{Song Name}, album name—{Album Name}, artist name—{Artist Name}, genre name—{Genre Name}, playlist name {Playlist Name}, media type→{Media Type}, sort type→{Sort Type}, play mode—{Play Mode}, service name—{Service Name}, anaphor—{Anaphor}, list position—{List Position}, recommend trigger—{Recommended Trigger}, and similar trigger—{Similar Trigger}. From NLU system 260, the text data may be used to identify some or all of the values for these slots. For example, if the utterance is, "Play 'Song 1'," then {Song Name} may have a value "Song 1." However, the remaining slots may remain unfilled. The contextual metadata may indicate information regarding a GUI displayed by display screen 212, where the GUI includes a detailed page associated with a song (e.g., "Song 1") or be a list including one item, the song. For example, the contextual metadata may include a song name contextual slot, {Song Name}, with a filled value being "Song 1," as well as an album name contextual slot, {Album Name}, having a filled value "Album 1." In this particular scenario, the album name contextual slot {Album Name} may be provided to NLU system 260.

Contextual resolution system 270 may, in some embodiments, be configured to determine that one or more of the declared slots from the intent matches one or more contextual entity slots from the contextual metadata. This may allow for resolution of the entity based on the contextual metadata. For example, if an individual says, "Play 'Song 1'," and the contextual metadata indicates that there is a contextual entity slot {Song Name} having a value "Song 1," then the specific song to be played may be determined to be the audio filed associated with "Song 1."

Contextual resolution system 270, in one embodiment, may be configured to determine a heuristics score that indicates a number of matching entities (e.g., matching slots) between the entity data/contextual metadata and the declared slots for the identified intent. For example, using the previous example, the contextual metadata may include such slots as {Song Name}, {Album Name}, and/or {Artist Name}, amongst other slots. Therefore, in this particular scenario, the heuristics score may be three, indicating that there are three slots corresponding to similar entities for both the declared slots from IC component 274 and contextual resolution system 270. If the heuristics score is greater than zero, then NLU system 260 may be configured to generate a selected context file that may be included with the output data from NLU system 260, which orchestrator 250 may provide back to an application, or applications, of functionalities system 262 to perform, or attempt to perform, one or more actions.

Functionalities system 262 may, for example, correspond to various action specific applications, which are capable of processing various task specific actions and/or performing various functionalities. Functionalities system 262 may further correspond to first party applications and/or third party applications capable of performing various tasks or actions, or performing various functionalities. For example, based on the context of the audio received from electronic device 100, speech-processing system 200 may use a certain application to generate a response, or to obtain response information, which in turn may be communicated back to electronic device 100 and/or to another electronic device (e.g., a television). Functionalities system 262 may also include processor(s) 252, storage/memory 254, and communications circuitry 256.

In some embodiments, an application of functionalities system 262 may be written in various computer languages, such as JavaScript and Java. Various applications may include an intent schema file and a sample utterances file, such as, for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java modules.

TTS system 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

User accounts system 268 may store one or more user accounts or user profiles, corresponding to users having an account on speech-processing system 200. For example, a parent may have an account registered on speech-processing system 200, and each of the parent's children may have their own user profile registered under the parent's account. Information, settings, and/or preferences, for example, for each user profile may be stored by user accounts system 268. In some embodiments, user accounts system 268 may store a voice signal, such as voice biometric information, for a specific user profile. This may allow speaker identification techniques to be used to match a voice to voice biometric data associated with a specific user profile. In some embodiments, user accounts system 268 may store a telephone number assigned to a particular user profile. In some embodiments, user accounts system 268 may include a list of media items currently stored within an individual's registered account or user profile. For example, a list of music or videos purchased or obtained by an individual may be stored within the individual's user profile on user accounts system 268, which may be accessed by the individual when the individual seeks to hear a particular song or songs, or view a particular video or videos. User accounts system 268 may also include a listing of all applications currently enabled for each user profile. In some embodiments, NLU system 260 may receive indications of which applications are currently enabled for a particular user profile or account, such that NLU system 260 is aware of which rules and capabilities that speech-processing system 200 is able to perform for the particular user profile or account.

Orchestrator 250, in a non-limiting embodiment, may correspond to any suitable device, system, and/or logic capable of performing one or more processes. For example, orchestrator 250 may be configured to request contextual metadata from one or more domains/applications of functionalities system 262 in response to receive a notification from electronic device 100 that content is currently being rendered thereby. In response to receiving the contextual metadata, orchestrator 250 may be configured to provide the contextual metadata to NLU system 260. In one embodiment, orchestrator 250 may include processor(s) 252, storage/memory 254, and communications circuitry 256.

Persons of ordinary skill in the art will recognize that although each of ASR system 258, NLU system 260, functionalities system 262, TTS system 264, user accounts system 268, and orchestrator 250 may each include instances of processor(s) 252, storage/memory 254, and communications circuitry 256, and those instances of processor(s) 252, storage/memory 254, and communications circuitry 256 within each of ASR system 258, NLU system 260, functionalities system 262, TTS system 264, user accounts system 268, and orchestrator 250 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Figure 2B:
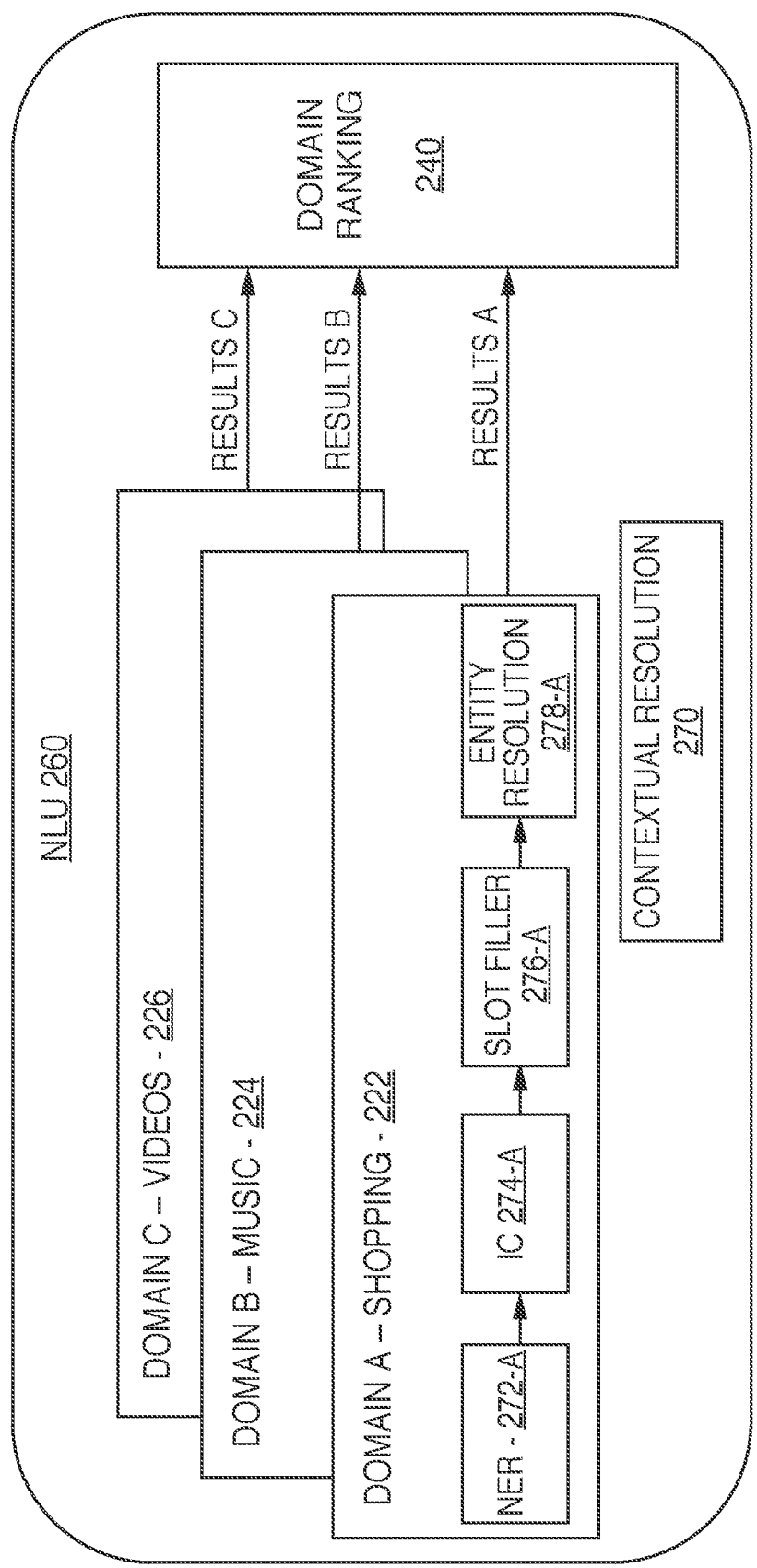
FIG. 2B is an illustrative diagram of a multi-domain architecture for an NLU system of FIG. 2A, in accordance with various embodiments.

FIG. 2B is an illustrative diagram of a multi-domain architecture for NLU system 260 of FIG. 2A, in accordance with various embodiments. In the multi-domain architecture of NLU system 260, each domain (which may include a set of intents and entity slots that define a larger concept such as music, books, etc.) may be constructed separately and be made available to NLU system 260 during runtime operations where natural language understanding functionality operations are performed on text (such as text output from ASR system 258). Each domain may have specially configured components to perform various steps of the NLU operations. For instance, each domain may include a component of NER system 272, IC system 274, Slot Filler system 276, and entity resolution system 278, which may be specific to that particular domain. In some embodiments, slot filler system 276 and/or entity resolution system 278 may be configured to perform their corresponding functions without deferring until after domain ranking has occurred, however persons of ordinary skill in the art will recognize that this is merely exemplary. Furthermore, a language model associated with a particular user account may specify various input and output characteristics of NLU system 260, which may vary from user to user based on that particular user's language model.

In the illustrative embodiment, a shopping domain 222 (Domain A) may have an NER component 272-A that identifies what slots, fields, or placeholders (i.e., portions of input text) may correspond to particular entities relevant to that domain. The NER component 272-A may use a machine learning model, such as a domain specific conditional random field ("CRF") to both identify the portions corresponding to an entity as well as identify what type of entity corresponds to the text portion. For example, for the text "Buy 'Coffee Maker'," an NER component 272-A trained for a shopping domain may recognize the portion of text (e.g., "Coffee Maker") corresponds to an entity and an item name. Shopping domain 222 may also have its own intent classification (IC) component 274-A that determines the intent of the text, assuming that the text is within the proscribed domain. IC components may use a model, such as a domain specific maximum entropy classifier, to identify the intent of the text. Shopping domain 222 may also have its own Slot Filler component 276-A that can apply rules or other instructions to standardize labels or tokens from previous stages into an intent/slot representation. The precise transformation may depend on the domain. For example, a travel domain may include a text mention of "<Location> airport," and may be transform the text mentioned to the standard three-letter code referring to that airport (e.g., ZZZ). Shopping domain 222 may also have its own Entity Resolution component 278-A that can refer to an authority source (such as a domain specific knowledge base) used to specifically identify the precise entity referred to in the entity mention identified in the incoming text. Specific intent/slot combinations may also be tied to a particular source, which may then be used to resolve the text (such as by providing information or a command to be executed in response to a user query). Using the example, "Buy 'Coffee Maker'," the source may be tied to a listing of applications and the application names associated with those applications. The output from Entity Resolution component 278-A may include a command, information, or other NLU result data indicating how the domain specific NLU processing handled the text and how the system should respond to the text, according to that specific domain.

As another example, a music domain 224 (Domain B) may have an NER component 272-B that may identify a portion of the input text that may refer to a particular slot. For example, for the text "play songs by 'Artist 1'," an NER component trained for a music domain may recognize the portion of text (e.g., "Artist 1") corresponds to an entity and an artist name. Music domain 224 may also have its own intent classification (IC) component 274-B that may determine the intent of the text, assuming that the text is within the proscribed domain. Music domain 224 may also have its own Slot Filler component 276-B that can apply rules or other instructions to standardize labels or tokens from previous stages into an intent/slot representation. Music domain 224 may also have its own Entity Resolution component 278-A that can refer to an authority source (such as a domain specific knowledge base) used to specifically identify the precise entity referred to in the entity mention identified in the incoming text. Furthermore, entity resolution component 276-D, as well as, in one embodiment, slot filler 276-C, may determine if an entity corresponds to the slot labeling. Specific intent/slot combinations may also be tied to a particular source, which may then be used to resolve the text (such as by providing information or a command to be executed in response to a user query). Using the example, "play songs by Artist 1," the source may be tied to a personal music catalog or the like. The output from Entity Resolution component may include a command, information, or other NLU result data indicating how the domain specific NLU processing handled the text and how the system should respond to the text, according to that specific domain.

In some embodiments, the multiple domains of NLU system 260 of FIG. 2B may operate substantially in parallel, with different domain specific components. That is, shopping domain 222, may have its own NER component 272-A, IC module 274-A, Slot Filler component 276-A, and Entity Resolution component 278-A. Music domain 224 may also have similar components, and so on for the different domains available to the system. The same text that is input into the NLU pipeline for Shopping Domain 222 may also be input into the NLU pipeline for Music Domain 224, where the components for Music Domain 224 may operate on the text as if the text related to Music Domain 224, and so on for the different NLU pipelines for the different domains. Each domain specific NLU pipeline will create its own domain specific NLU results, for example Results A for Shopping Domain 222, Results B for Music Domain 224, Results C for Video Domain 226, and so on. The different results may then be input into a domain ranking component 240, which may rank the different results for the different domains, and selects what the system believes to be the most applicable results given the input text and other factors. Those highest ranking results may then be used to execute a command, perform one or more actions, or obtain information responsive to a user query, or otherwise respond to the input text. In some embodiments, a list of hypotheses after all domains have completed named entity recognition and intent classification may be truncated, and the slot filling and entity resolution may occur on the un-truncated hypotheses. Reordering of the results may further be performed after the slot filling and entity resolution occurs. Persons of ordinary skill in the art will recognize that NLU system 260 may include any number of domains related to any particular subject, and the three domains included in FIG. 2B (e.g., Shopping Domain 222, Music Domain 224, and Video Domain 226) are merely exemplary.

Such a multi-domain architecture results in narrowly defined intents and slots that are particular for each specific domain. This is due, in part, to the different models and components (such as the domain specific NER component, IC module, etc. and related models) being trained to operate only for the designated domain. Further, the separation of domains results in similar actions being represented separately across the domains even if there is overlap in the action. For example, "next song," "next book," and "next" may all be indicators of the same action, but will be defined differently in different domains due to domain specific processing restrictions. Further, domain agnostic queries that cross domains may be difficult to holistically respond to given the divisions between domains. For example, the query "get Title" may refer to a request to purchase a book, play a movie, or play a soundtrack, but the multi-domain architecture and approach of NLU system 260 of FIG. 2B may result in only one such action being performed with any acknowledgement of ambiguity as the "Title" can refer to a book, movie, or soundtrack (or possibly all three).

Persons of ordinary skill in the art will further recognize that, in one embodiment, text data representing a response may be generated by speech-processing system 200. For instance, NLU system 260 and/or functionalities system 262 may be employed to determine contextual features of a response to be generated, and may generate the corresponding text data representing that response. The text data may then be provided to TTS system 264, which may generate audio data representing the text data, which may then be sent to the requesting device.

In some embodiments, NLU system 260 may include contextual resolution system 270, which may be employed to assist in resolving certain entities based on contextual metadata associated with displayed content. For example, electronic device 100 may display a detail web page of an item available for purchase by an individual. The detail web page may include contextual metadata indicating various entities associated with the item such as, but not limited to, an item name—{Item Name}, an item identifier—{Item Identifier}, and the like. In some embodiments, the contextual metadata may also include an anaphoric term, {Anaphoric Term}. If the text of an utterance is, for example, "Buy this," then NLU system 260 may identify that the intent as being a purchasing intent having an entity resolution "Buy," and may also include an anaphoric term "this." Based on this information available from the text data, the purchasing domain may not be able to determine the specific action to perform because the entity "this" may not be able to be associated with a particular item. In this illustrative example, the contextual metadata may assist an application for resolving missing entities. Contextual resolution system 270 may determine which, if any, entities match between the contextual metadata and the declared slots for a particular domain. For example, the purchasing intent may include a slot for an item name, and the contextual metadata may also include a slot for item name having a particular value associated with it. After shopping domain 222 outputs data including any resolved entities, contextual resolution system 270 may append the contextual metadata including the slot and the particular value associated with that slot to the output data. The output data may then be passed to the corresponding application identified by NLU system 260, and the application may use the output data including the selected context file to process the request. In one example, if a coffee maker having an item name "Coffee Maker" is displayed on display screen 212, then the contextual metadata may include a contextual slot for the entity {Item Name} having a value being "Coffee Maker." Furthermore, a unique identifier associated with the coffee maker having the item name "Coffee Maker" may be included for processing by shopping domain 222. Therefore, when shopping domain 222 outputs data to a shopping application, that output data may include contextual metadata indicating the unique identifier associated with the item.

Figure 3A:
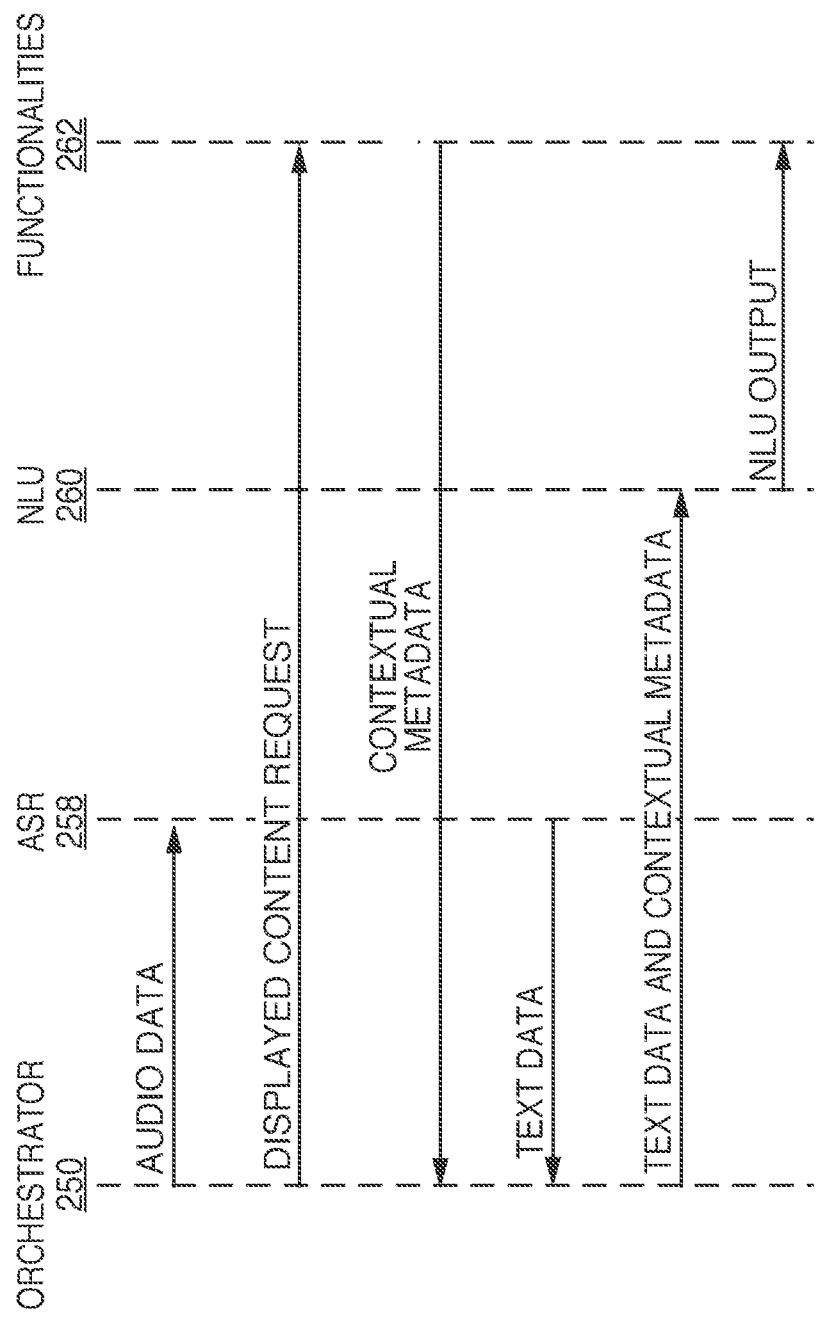
FIG. 3A is an illustrative diagram of a process flow for the system architecture of FIG. 2A, in accordance with various embodiments.

FIG. 3A is an illustrative diagram of a process flow for the system architecture of FIG. 2A, in accordance with various embodiments. As seen by FIG. 3A, upon receipt of audio data representing an utterance (e.g., utterance 4), orchestrator 250 of speech-processing system 200 may cause the audio data to be sent to ASR system 258. Similarly, at a substantially same time, orchestrator 250 may determine whether a notification was received from electronic device 100, and if that notification indicates that content is currently being rendered by electronic device 100. For example, a notification corresponding to a logical 1 may be received that indicates that display screen 212 is currently displaying content. In response to receiving the notification, orchestrator 250 may generate and send a displayed content request to functionalities system 262.

Functionalities system 262 may include various applications, and the domains associated with the applications. For example, functionalities system 262 may include various music player applications, each of which may be associated with a music domain. Upon receiving the displayed content request, functionalities system 262 may determine which application, or applications, are currently providing content to electronic device 100. After identifying the particular application, or if more than one, applications, formatting logic for each application (e.g., a speechlet) may be applied to text corresponding to the content to generate contextual metadata. The contextual metadata may be formatted such that the text is parsed into contextual slots associated with the particular domain that the application responsible for providing the content is associated with. For example, if the music player application is providing the content to electronic device 100, the contextual metadata may be generated such that text corresponding to the content is parsed to include various slots associated with the music domain (e.g., "Song Name" slot, "Artist Name" slot, etc.). Furthermore, the contextual metadata may also include values attributed to the identified slots. For example, if the displayed content includes a song having a name "Song 1," then the "Song Name" slot would have a value associated with it, "Song 1." In one embodiment, the contextual metadata may be sent to NLU system 260 upon being generated by functionalities system 262. However, persons of ordinary skill in the art will recognize that, alternatively, the contextual metadata, upon being generated by functionalities system 262, may be provided by to orchestrator 250, which in turn may cause the contextual metadata corresponding to the entity data representing the displayed content to be provided to NLU system 260. Similarly, orchestrator 250 may also receive text data representing the audio data from ASR system 258. In some embodiments, orchestrator 250 may be further configured to cause the text data (and the contextual metadata, if received from functionalities system 262) to NLU system 260. The text data and the contextual metadata need not be received by NLU system 260 at a substantially same time, and the illustrative embodiment is merely exemplary. For example, the text data may be received by NLU system 260 prior to the contextual metadata.

After receiving the text data, NLU system 260 may determine an intent of the utterance based on the text data, and may attempt to resolve one or more entities using the text data. After filling-in one or more slots with a value obtained from the text data, NLU system 260 may determine, using contextual resolution system 270, whether any entities from the entity data representing the displayed content match any of the entities from the intent. If so, then contextual resolution system 270 may place the matching entities into a selected context file, and output data from NLU system 260 may be generated including the resolved entities, if any, and the selected context file. The output data may then be passed back to the identified application, or applications, associated with the determined intent, and one or more actions (e.g., causing a song to play, purchasing an item), may be performed.

Figure 3B:
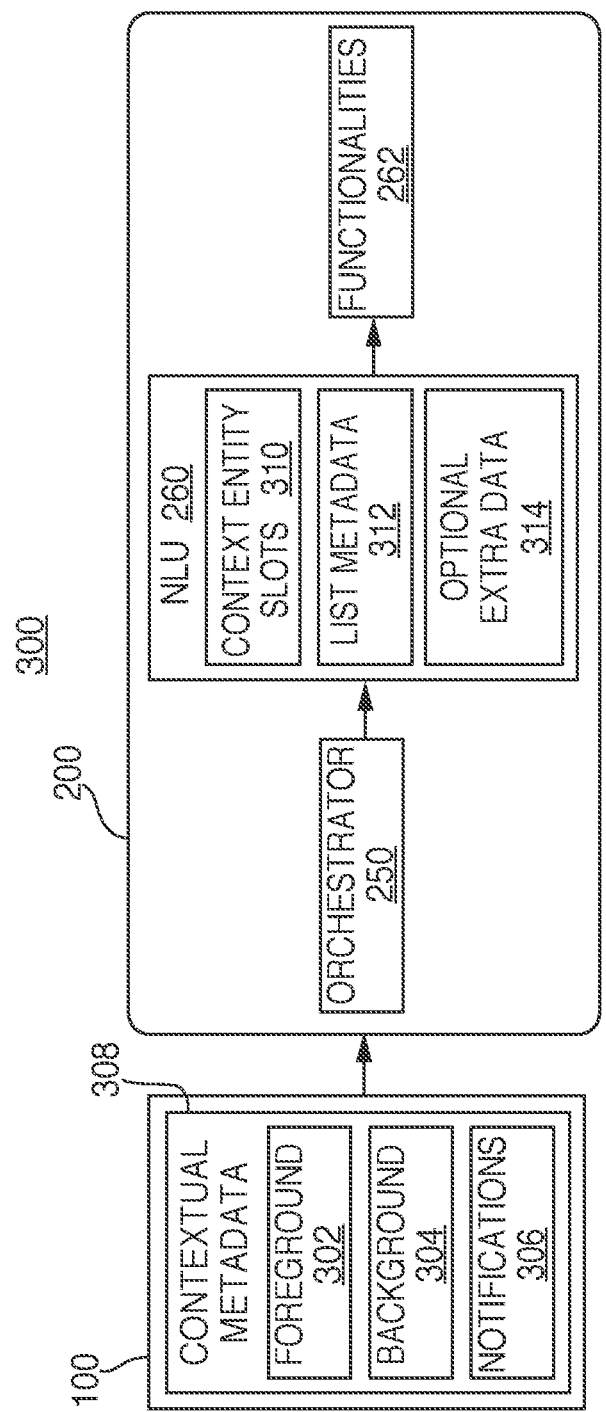
FIG. 3B is an illustrative diagram of an exemplary system indicating techniques for contextual metadata to be provided to an NLU system from a device, in accordance with various embodiments.

FIG. 3B is an illustrative diagram of an exemplary system indicating techniques for contextual metadata to be provided to an NLU system from a device, in accordance with various embodiments. System 300, in the non-limiting embodiment, indicates a process by which electronic device 100 may provide contextual metadata to speech-processing system 200 for use in contextual entity resolution. In the illustrative embodiment, various types of context may be considered by components of NLU system 260. The context may include 'live' entities for electronic device 100 such as foreground context 302, background context 304, and notifications context 306. Foreground context 302, in one embodiment, may correspond to content being rendered by display screen 212. For example, lists of items (e.g., "To-Do" lists), detail pages (e.g., a single item view of a web page), video content (e.g., a movie playing on electronic device 100), and the like, may correspond to foreground context 302. Background context 304, in one embodiment, may correspond to content available for electronic device 100, but not necessarily being at a foreground of electronic device 100. For example, songs, audio books, or any other type of audio file, being output by speakers 210 may correspond to one exemplary type of background context. Notifications 306 may correspond to any type of notification capable of being provided to electronic device 100, but which may or may not constitute foreground or background context. For example, a notification indicating that a telephone call is incoming or has been missed, an email has been received, and the like, may correspond to various types of notification context.

Foreground context 302, background context 304, and notifications context 306 may each be employed to generate contextual metadata. Contextual metadata 308 may include, in some embodiments, context entity slots, list metadata, and/or any other suitable type of data (e.g., item specific identifiers). As an illustrative example, list metadata may indicate, amongst other entities, a list identifier entity—{List ID} indicating a domain relatable list identifier, a list position or absolute ordinal entity—{List Position}, and an item identifier—{Item ID}. List metadata may be used for list-related information for one or more contextual list items. Using this example, if a single object, such as a box of chocolates, is being displayed on display screen 212, then {List ID} may have a value "<domain>_<custID>_<sessionID>," {List Position} may have a value "1", and {Item ID} may have a value "abcd1234." As another illustrative example, context entity slots may include {Item Name} having a value "Chocolate Item Name." The context entity slots may be used for specifying list-related attributes that may be searched when tied to declared slots from NLU system 260. Additional data, in an illustrative embodiment, may include {Item Identifier} having a value "XXXyyyZ1234." If the list currently being displayed by display screen 212 included more than one item, for example, similar information for the second item may be included within contextual metadata 308, however the corresponding list position {List Position} may have a different value indicating that item's position within the list (e.g., a second list item may have a value "2" for its {List Position}). In this way, if an individual's utterance is directed a particular action to occur to a list item based on list position, the correct item may be identified (e.g., "Alexa, delete number two").

In some embodiments, songs/music playing in the background (e.g., background context 304) may also be included by contextual metadata 308. For example, the background context may include a unique identifier for the current audio file being played, such as a {Music Track Identifier} having a value "AAAbbbC6789." The background context may also include its own set of context entity slots such as, but not limited to, {Song Name} (e.g., "Song 1"), {Artist Name} (e.g., "Artist 1"), and {Album Name} (e.g., "Album 1"). In some embodiments, because the background context (e.g., background context 304) is not of a list form, list metadata may not be included, however persons of ordinary skill in the art will recognize that this is merely exemplary.

Table 1 is an exemplary table including various example domains, their GUI list type, sample utterances that may be used when a corresponding GUI list is displayed, and an exemplary context entity slot that may be included.

TABLE 1

| Domain | GUI List Type | Sample Utterance | Context Entity Slot |
|---|---|---|---|
| ToDos | To-Do list | "Delete the first one" "Mark go running done" | {To Do Content}: "go running" |
| Shopping | Product Results | "Buy the first one" | {Item Name}: "Chocolate Bar Name" |
| Music | Songs | "Play the first one" | {Song Name}: "Song 1" {Artist Name}: "Artist 1" |

In some embodiments, Table 2 may correspond to an exemplary table for anaphora resolution including various example domains, their GUI list type, sample utterances that may be used when a corresponding GUI list is displayed, and an exemplary context entity slot that may be included. In one embodiment, list information entities, such as {List ID}, {Item ID}, and/or {List Position} may not be included unless the displayed list is a single item list.

TABLE 2

| Domain | GUI List Type | Sample Utterance | Context Entity Slot |
|---|---|---|---|
| Shopping | A purchasable product | "Buy this" "Add this to my shopping list" | {Item Name}: "Chocolate Bar Name" |
| Music | A playable song | "Play this" | {SongName}: "Song 1" {Artist Name}: "Artist 1" |
| Video | A playable video | "Play this" | {Video Name}: "Video 1" |

In some embodiments, entities representing the displayed content, including text or other data corresponding to the slots/fields and their corresponding values, may be provided to NLU system 260. For example, context entity slots 310, list metadata 312, and optional extra data 314, and their corresponding values, may be provided to NLU system 260 for intent resolution. As an illustrative example, context entity slots 310 may include an item name of an item displayed by display screen 212. In this way, if an individual says, "Buy this," the information corresponding to the item name of the item displayed by display screen 212 may be provided to NLU system 260.

Contextual metadata 308, in one embodiment, may be provided to speech-processing system 200, and in particular to orchestrator 250. As opposed to requesting the contextual metadata from functionalities system 262, as illustrated above with reference to FIG. 3A, orchestrator 250 may cause contextual metadata 308 to be provided NLU system 260. In some embodiments, orchestrator 250 may also provide text data representing received audio data to NLU system 260. The output data from NLU system 260, which may include one or more resolved entities and a selected context file, may then be provided to functionalities system 262 to cause, or to attempt to cause, one or more actions to occur. However, in some embodiments, contextual metadata 308 may be provided to NLU system 260, instead of being provided to orchestrator 250 and then NLU system 260, however persons of ordinary skill in the art will recognize that this is merely exemplary.

Figure 4:
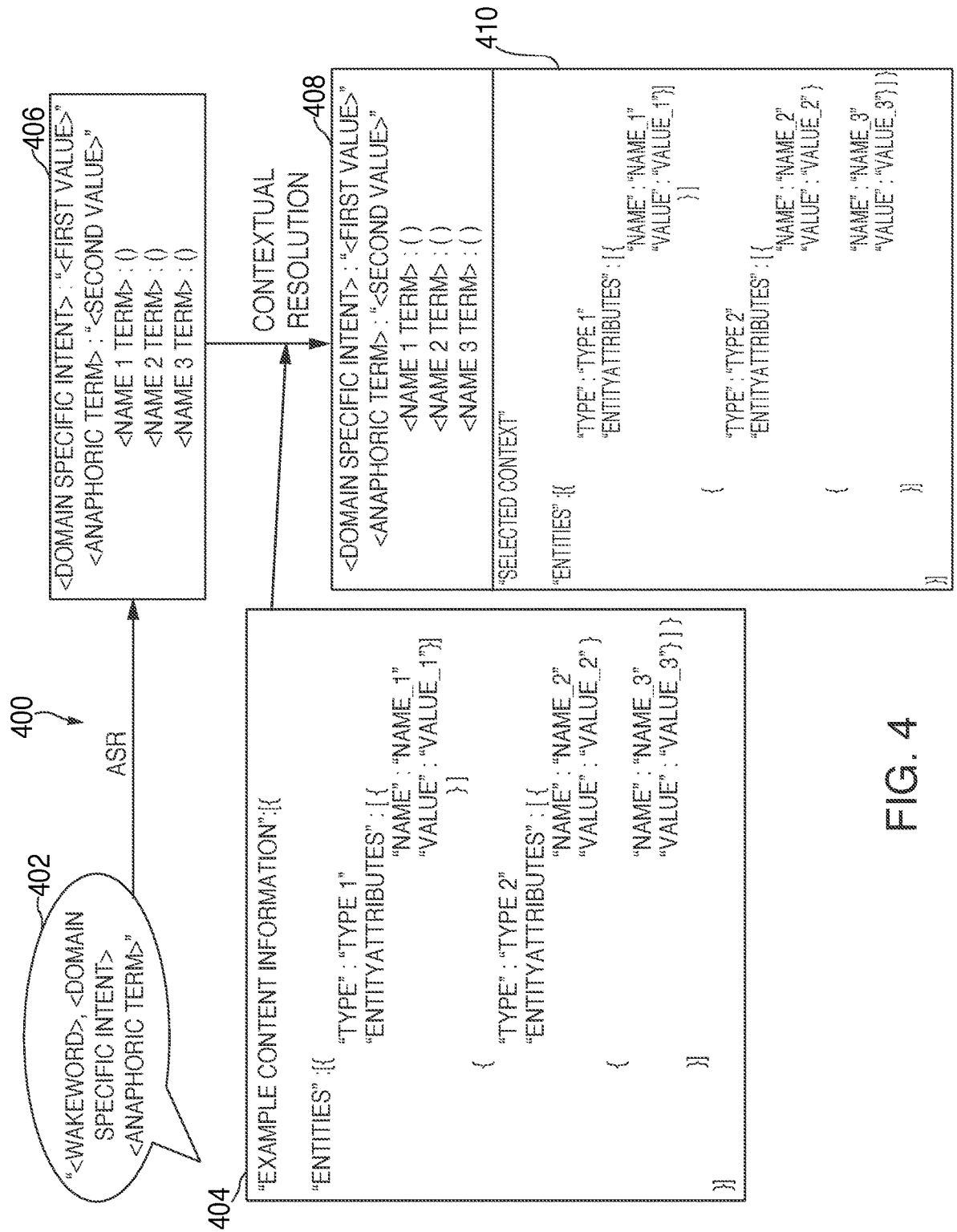
FIG. 4 is an illustrative diagram of an exemplary system indicating a technique for generating output data using contextual resolution processing, in accordance with various embodiments.

FIG. 4 is an illustrative diagram of an exemplary system indicating a technique for generating output data using contextual resolution processing, in accordance with various embodiments. System 400, in the non-limiting embodiment, includes an utterance 402, which may be spoken to an individual's voice activated electronic device. For instance, an individual may speak utterance 402, "<Wakeword>, <Domain Specific Intent><Anaphoric Term>," to electronic device 100. As an illustrative example, individual 2 may utter, "Alexa, play this," or "Alexa, buy this." In one embodiment, electronic device 100 may send audio data representing utterance 402 to speech-processing system 200 in response to determining that utterance 402 includes <Wakeword> (e.g., "Alexa").

Upon receipt of the audio data representing utterance 402, speech-processing system 200, and in particular orchestrator 250, may provide ASR system 258 with the audio data. ASR system 258 may, using STT system 266, generate text data representing the audio data by performing speech-to-text processing to the audio data. Speech-processing system 200, using orchestrator 250, for instance, may then provide the text data to NLU system 260 to determine an intent of utterance 402 based, at least in part, on the text data that was generated.

As described in greater detail above with reference to FIGS. 2A and 2B, NLU system 260 may determine an intent of utterance 402 based on a language model associated with a domain of NLU system 260. For example, if the text data includes the word "play," then a music domain, a video domain, and/or an electronic book domain may each recognize the intent. Each intent may include a certain amount of declared slots, which NLU system 260, and in particular, NER component 272, IC component 274, Slot Filler component 276, and Entity Resolution component 278, may attempt to identify values for from the text data. As an illustrative example, NLU system 260 may determine that, for a particular domain, the declared slots may be for {Domain Specific Intent}, the entities {Anaphoric Term}, {Name 1 Term}, {Name 2 Term}, and {Name 3 Term}, as described by output data 406. Based on the text data, it may be determined that {Domain Specific Intent} has a value "first value," and {Anaphoric Term} has a value "second value." However, {Name 1 Term}, {Name 2 Term}, and {Name 3 Term} may remain unfilled slots as NLU system 260 may have been unable to resolve these entities from the text data for output data 406.

In some embodiments, in response to receiving the audio data representing utterance 402, orchestrator 250 may also receive an indication that content is currently being rendered by electronic device 100. For instance, along with the audio data, a notification may be received by orchestrator 250 from electronic device 100 that indicates that display screen 212 is currently displaying content thereon. After receiving the indication, orchestrator 250 may generate and send a request to functionalities system 262 to receive entity data representing the displayed content. In some embodiments, however, orchestrator 250 may be configured to request entity data regardless of whether a notification is received, or regardless of whether content is currently being rendered by electronic device 100. For instance, if the indication received from electronic device 100 indicates that no content is being displayed by display screen 212, then contextual metadata may still be requested, however that contextual metadata may be null, or empty (e.g., no slots and/or no values for the slots).

Entity data 404, which may also correspond to contextual metadata, in one embodiment, may describe content currently being rendered by display screen 212 (e.g., text or other data). For example, if a single item list is being displayed by display screen 212, entity data 404 may include information related to the displayed item, such as the item's name, an identifier of the item, and the like. As another example, entity data 404 may include information regarding background context as well as foreground context, such as rendered content by display screen 212 and a song being played by electronic device 100. In the latter's case, entity data 404 may include information such as, but not limited to, a song name of the song being output, an artist name of the song, and/or an album name for the song.

In some embodiments, entity data 404 may be provided to NLU system 260, and in particular, to contextual resolution system 270. In one embodiment, entity data 404 may be provided to orchestrator 250, which may cause entity data 404 to be sent to NLU system 260. Entity data 404, in one embodiment, may include entity attributes corresponding to different types of entities, such as a first type of entity {Type} having a value "Type 1," and a second type of entity {Type} having a value "Type 2." As an illustrative example, "Type 1" may correspond to "context entity slots," and "Type 2" may correspond to "list metadata." Each entity type may include one or more attributes, which may be slots having values associated with a particular object or item. For instance, the first type of entity may have entity attribute {Name}: "name 1," having a {value}: "value 1." Similarly, the second type of entity may have entity attributes {Name}: "name 2," having {value}: "value 2," and {Name}: "name 3," having {value}: "value 3." As an illustrative example, if the item being described by entity data 404 is a chocolate bar, "name 1" may correspond to an item name, where "value 1" would correspond to the name of the chocolate bar. Along those same lines, "name 2" may correspond to a list position, where "value 2" corresponds to an absolute ordinal position associated with the displayed item (e.g., "1"), and "name 3" may correspond to an item identifier, where "value 3" corresponds to the item identifier of the chocolate bar, such as "abcd1234."

Using entity data 404, contextual resolution system 270 may be capable of determining whether there are any matching entities for the domain specific intent identified by NLU system 260 for output data 406. For example, because the slots of output data 406: {Name 1 Term}, {Name 2 Term}, and {Name 3 Term} correspond to substantially similar entities as the declared slots identified by NLU system 260, contextual resolution system 270 may place the matching entities in a selected context output 410, which may be included with output data 408. In this way, output data 408 may be generated including the determined intent and the selected context 410. For example, the output data may include entities and their filled in values from NLU system 260, and selected context output 410 indicating matching entities between output data 406 and entity data 404, as well as values that may be attributed to the matching entities from entity data 404. Output data 408 including selected context output 410 may then be passed back to an application associated with the domain specific intent, which may employ output data 408, as well as selected context output 410, for causing one or more actions to be performed.

Figure 5A:
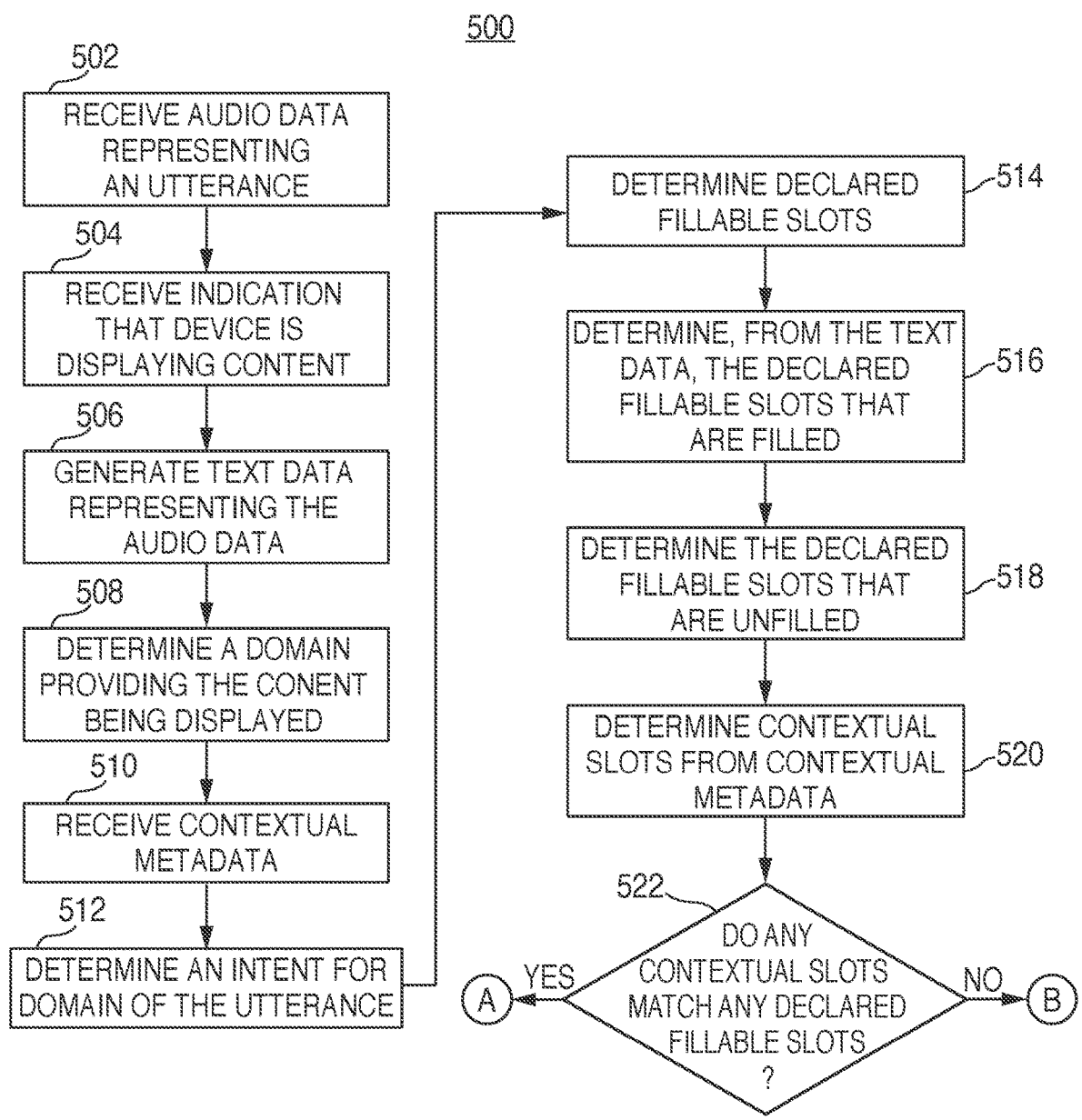
FIGS. 5A and 5B are illustrative flowcharts of an exemplary process for performing contextual resolution processing in conjunction with natural language understanding processing, in accordance with various embodiments.
Figure 5B:
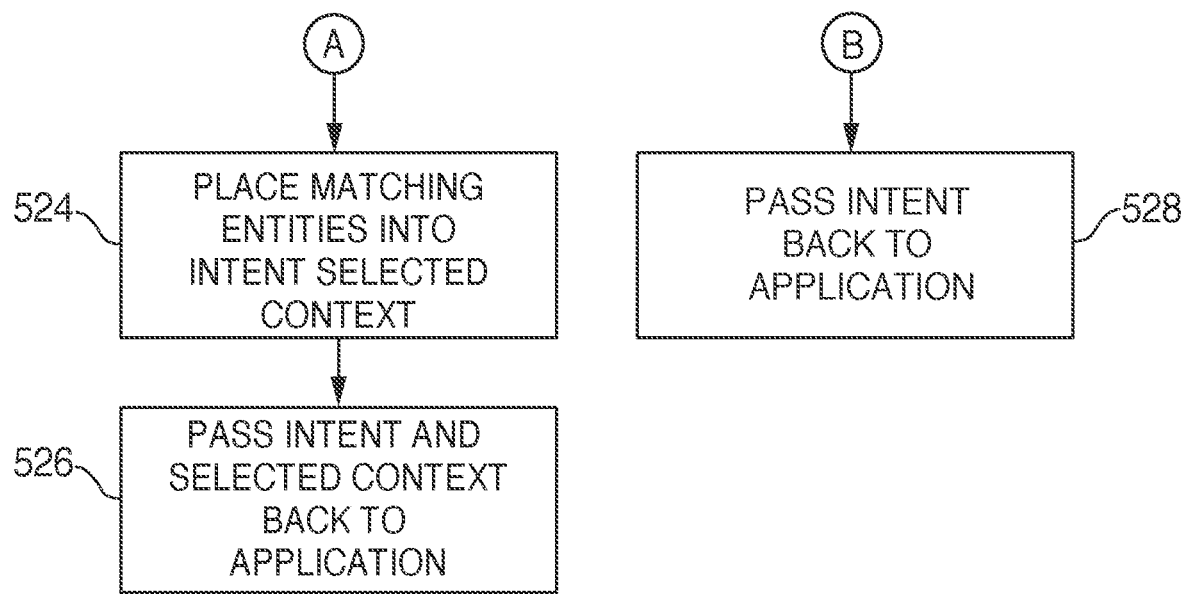

FIGS. 5A and 5B are illustrative flowcharts of an exemplary process for performing contextual resolution processing in conjunction with natural language understanding processing, in accordance with various embodiments. Process 500, in a non-limiting embodiment, may begin at step 502. At step 502, audio data representing an utterance may be received. For instance, audio data representing utterance 4 of FIG. 1 may be received by speech-processing system 200 from electronic device 100. At step 504, an indication may be received that indicates that the device with which the audio data was received from is currently displaying content. For example, in response to sending the audio data representing utterance 4, electronic device 100 may send an indication, or notification, that content is currently being displayed by display screen 112. The indication/notification may, in one embodiment, be received by orchestrator 250, which may determine whether the notification indicates that content is being displayed by electronic device 100, or whether content is not being displayed by electronic device 100. At step 506, text data representing the audio data may be generated. For instance, in response to receiving the audio data, speech-processing system 200, an in particular orchestrator 250, may provide ASR system 258 with the audio data. ASR system 258 may then generate text data representing the audio data by performing speech-to-text processing to the audio data using STT system 266.

At step 508, a domain that is providing the content being displayed by electronic device 100 may be determined. For instance, in response to receiving the indication at step 504, orchestrator 250 may generate and send a displayed content request to functionalities system 262. The displayed content request may inquire to each domain and application of functionalities system 262 which, if any, are responsible for providing the content currently being displayed by electronic device 100. Upon determining the domain—as well as the application(s)—providing the content, contextual metadata may be generated by the domain using formatting logic. The contextual metadata may be generated such that text corresponding to the content being displayed is formatted into slots and values associated with those slots, where the slots correspond to the slots associated with the domain's intent. For example, if the application providing content is a music player application, then a music domain may cause the contextual metadata to be formatted such that it indicates one or more music domain intent slots, and any values that may able to be attributed to those slots (e.g., {Song Name}: "Song 1").

At step 510, orchestrator 250 may receive the contextual metadata from functionalities system 260, and may then provide the contextual metadata to NLU system 260. In one embodiment, the contextual metadata that was requested may be received by NLU system 260 from functionalities system 260, and in particular, a domain responsible for providing the displayed content. Persons of ordinary skill in the art will recognize that electronic device 100 may, alternatively, generate and send the contextual metadata to speech-processing system 200 in response to determining that a wakeword (e.g., "Alexa") was uttered. For instance, the detection of the wakeword within a spoken utterance may cause electronic device 100 to begin sending audio data representing sounds detected by microphones 208 to speech-processing system 200. In this particular scenario, electronic device 100 may begin packing and sending contextual metadata related to content currently being displayed by display screen 212 in response to the activation of electronic device 100. Furthermore, in some embodiments, electronic device 100 may send contextual metadata corresponding to content rendered by display screen 212 to speech-processing system 212 at various temporal intervals. For example, electronic device 100 may generate and send contextual metadata related to the content displayed by display screen 212 to speech-processing system every few seconds, minutes, hours, and the like.

At step 512, an intent for the utterance may be determined based on one or more domains of NLU system 260. For example, if the utterance is, "Play this," then domains such as a Music Domain, Video Domain, and Electronic Book Domain, may recognize the word "play" as an action that they are able to service. Therefore, each domain that recognizes an action from the received text data may determine a corresponding intent that the utterance may be related to based, at least in part, on that domains pre-stored language model(s). At step 514, declared slots capable of being filled for a particular intent may be determined. For example, a play music intent may include declared slots such as one or more of: "Application Data" slot—{Application Data}, "Song Name" slot—{Song Name}, "Album Name" slot—{Album Name}, "Artist Name" slot—{Artist Name}, "Genre Name" slot—{Genre Name}, "Playlist Name" slot—{Playlist Name}, "Media Type" slot—{Media Type}, "Sort Type" slot—{Sort Type}, "Play Mode" slot—{Play Mode}, "Service Name" slot—{Service Name}, "Anaphor" slot—{Anaphor Term}, "List Position" slot—{List Position}, "Recommended Trigger" slot—{Recommended Trigger}, and/or "Similar Trigger" slot—{Similar Trigger}. Different intents may include different declared slots, and some intents may include more or fewer slots than other intents. In some embodiments, one or more slots may be common to multiple intents. For example, each intent may include an anaphoric term slot—{Anaphoric Term}.

At step 516, declared slots having values capable of being filled by the text data may be determined. For instance, frameworks linked to an intent may be used to determine fields to be searched to determine the meaning of phrases from the text data. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer information, NER system 272 may search the database of generic words associated with the particular domain. So for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

Thus, to fill-in, or determine which slots may be filled in using the text data, NLU system 260 may tag attribute meanings to a query text. So, for instance, "Play 'Song 1' by 'Artist 1'" might produce a result of: {Domain}: "Music," {Intent}: "Play Music," {Artist Name}: "Artist 1," and {Song Name}: "Song 1." In some embodiments, the result may also include {Media Type}: "Song." As another example, "Play this," might produce: {Domain}: "Music," {Anaphoric Term}: "this." Still further, "Add this to my cart'" might produce a result of: {Domain} Shopping, {Intent} "Add item to," {Anaphoric Term}: "this," and {List Type} "cart."

At step 518, declared fillable slots that are unfilled after natural language understanding processing may be determined. For example, for the text, "play this," {Domain} and {Anaphoric Term} may be resolved, while other entities—{Artist Name}, {Song Name}, and/or {Album Name}, may not be able to be resolved by the text data. At step 520, contextual slots from the contextual metadata that was received may be determined. For example, if the utterance is "play this," and a detailed page or single item list for a song is being rendered by a display screen (e.g., display screen 212), then contextual metadata may be generated describing the detail page/single item list. This contextual metadata, in one embodiment, may include contextual slots corresponding to such entities as {Artist Name}, {Song Name}, and {Album Name} and, furthermore, may include values for these entities. Contextual resolution system 270 may, therefore, identify each of these contextual slots from the contextual metadata that was received, and the values that are attributed to the contextual slots.

At step 522, a determination may be made as to whether or not any of the contextual slots match any of the declared fillable slots. For instance, contextual resolution system 270 may compare the contextual slots from the contextual metadata with the declared slots determined at step 514. If there are one or more matching slots (e.g., contextual slot for {Song Name} and a declared slot for {Song Name}), then process 500 may proceed to step 524. If no contextual slots from the contextual metadata match any of the remaining declared slots that have not been filled by the text data, then process 500 may proceed to step 528. At step 524, the matching entities, corresponding to the matching contextual slots and declared slots from the intent resolution, may be placed into an intent selected context. For instance, if the contextual metadata includes the slot {Song Name} having a value "Song 1," and the intent also includes a declared slot {Song Name}, then the slot {Song Name}, and the value "Song 1" for that slot, may be placed into a selected context file. The selected context file may correspond to data that may be included with the output of NLU system 260, and may indicate values associated with one or more matching entities.

In some embodiments, the number of contextual slots that match unfilled declared slots for a particular intent may be used for anaphora resolution. For example, the declared slot "Song Name" may be unfilled based on the text data, and the contextual slots may also include a "Song Name" slot. For anaphora resolution, because the unfilled "Song Name" slot matched the contextual "Song Name" slot (e.g., both correspond to a song name attribute), then this matching entity may be placed into the intent selected context at step 524.

In some embodiments, list resolution may include determining a number of filled declared slots that match contextual slots. For example, if the utterance is "Play 'Song 1'," then this may result in a filled declared slot "Song Name" matching a contextual slot (e.g., "Song Name"), having a value "Song 1." For list resolution, because the filled declared slot "Song Name" matched the contextual "Song Name" slot (e.g., both correspond to a song name attribute), then this matching entity may be placed into the intent selected context at step 524. In some embodiments, the match may not be exact. In some embodiments, the match may not be exact. For example, if an individual says, "Play the one by 'FirstName'," but the contextual metadata indicated that the "Artist Name" slot specified "FirstName LastName," then the entity "FirstName" may be returned for the intent selected context.

At step 526, the intent and the selected context may be passed to an application, or applications, of functionalities system 262, which may be used to perform one or more actions based on the resolved intent. For example, if the intent is for a music player application to play the song, the output data from NLU system 260 may include the contextual metadata corresponding to the displayed content, which may be passed to the music player application to determine the particular song to be played by electronic device 100. If, however, at step 522, it is determined that no declared slots match any slots from the contextual metadata, then process 500 may proceed to step 528, where the intent is passed back to the application, without any additional information, such as that information included in the selected context.

In some embodiments, contextual resolution system 270 may alternatively generate an output interpretation including the filled declared fillable slots and the matching contextual slot values may be generated, or the output may be generated by NLU system 260. As an illustrative example, the text, "play this," and contextual metadata describing content displayed by display screen 112 may resolve the entities {Domain}: "Music," {Anaphoric Term}: "this," {Song Name}: "Song 1," {Artist Name}: "Artist 1," and {Album Name}: "Album 1." Therefore, the generated output may include each of these entities—{Domain}, {Anaphoric Term}, {Song Name}, {Artist Name}, and {Album Name}—with their respective values—"Music," "this," "Song 1," "Artist 1," and "Album 1." In this particular scenario, an appropriate action, or actions, to occur for the intent having the output interpretation may be determined. Continuing the previous example, the action to occur may be to cause electronic device 100 to begin playing an audio file for a song having a title "Song 1." At step 532, the determined action(s) may be performed. For instance, the audio file may being playing the song "Song 1" using speaker(s) 210.

In one embodiment, an output interpretation including the sample utterance framework including the filled declared fillable slots may be determined. For example, if the text corresponds to, "Play this," then {Domain} and {Anaphoric Term} may be resolved to "Music" and "this," respectively. A determination may be made as to whether or not an action, or actions, is capable of being determined for the identified intent based on the generated output. If an action is able to be determined then that action may be caused to be performed. However, if the action is unable to be determined, then the application associated with the content being rendered by electronic device 100 may be accessed to determine a next step in the process for resolve the intent of the spoken utterance. For example, the application may determine that a follow-up response is required (e.g., "I'm sorry, I didn't understand. Please say . . . "). However, persons of ordinary skill in the art will recognize that this is merely exemplary, and in some embodiments, the application may not resolve the intent and the process may simply end.

Use of the contextual metadata to assist in entity resolution may be particularly helpful for anaphoric terms used within an utterance. This may be due to a lack of information being capable of being extracted from the text data of the utterance. Therefore, the multi-modal nature of a voice activated electronic device that also includes display functionality may be more fully harnessed to assist in the natural language understanding process, thereby increasing the overall user experience.

In some embodiments, historical models and machine learning techniques may be applied to the contextual resolution to further refine the natural language understanding processing. For example, if each time an individual utters the phrase, "play this," the system resolves to a play music intent with a song name obtained from the contextual metadata, speech-processing system 200 may determine that the song name slot—{Song Name} may be the only information needed for resolving the intent, and therefore may not even need to receive other slots, such as {Artist Name} or {Album Name}. However, in some embodiments, all available contextual slots may be obtained for each instance of contextual metadata being received by speech-processing system 200.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

The invention claimed is:

1. A system, comprising:
at least one processor; and
at least one computer-readable medium encoded with instructions which, when executed by the at least one processor, cause the system to:
  receive, over a first network connection between a computing system and a device controllable using voice commands, audio data representing an utterance received by the device,
  determine that a first content source provided content that was presented on a display screen associated with the device while at least a portion of the utterance was spoken,
  receive, from a first system component associated with the first content source and after receiving the audio data, contextual data representing at least a portion of the content, the first system component being remote from both of the device and the display screen,
  determine, by the computing system and based at least in part on the audio data and the contextual data, an intent of the utterance,
  determine output data corresponding to the intent, and
  send the output data to an application.

2. The system of claim 1, wherein the at least one computer-readable medium is encoded with additional instructions which, when executed by the at least one processor, further cause the system to:
  receive, from the device, an indication that the content was being presented by the display screen while at least the portion of the utterance was spoken,
  send, to the first system component, a first inquiry to determine if the first content source provided the content, send, to a second system component associated with a second content source, a second inquiry to determine if the second content source provided the content,
receive a response to the first inquiry, and
determine, based at least in part on the response, that the first content source provided the content.

3. The system of claim 1, wherein the application is associated with the first content source.

4. The system of claim 1, wherein the application is associated with a second content source.

5. The system of claim 1, wherein the application is associated with the first system component.

6. The system of claim 1, wherein the at least one computer-readable medium is encoded with additional instructions which, when executed by the at least one processor, further cause the system to:
generate entity data representing at least a portion of the audio data; and
send the entity data to the application.

7. The system of claim 1, wherein the at least one computer-readable medium is encoded with additional instructions which, when executed by the at least one processor, further cause the system to:
determine that the contextual data comprises entity data such that the output data further comprises the entity data.

8. The system of claim 1, wherein the at least one computer-readable medium is encoded with additional instructions which, when executed by the at least one processor, further cause the system to:
determine that the intent is associated with an action to be performed, the action involving a list;
determine that the intent corresponds to a list position; and
determine, based at least in part on the contextual data, that a list position value is associated with the list position.

9. The system of claim 1, wherein the at least one computer-readable medium is encoded with additional instructions which, when executed by the at least one processor, further cause the system to:
determine that the audio data represents an anaphoric term, the output data being generated further based at least in part on the anaphoric term.

10. The system of claim 1, wherein the at least one computer-readable medium is encoded with additional instructions which, when executed by the at least one processor, further cause the system to:
select the application based at least in part on the intent.

11. A method, comprising:
receiving, over a first network connection between a computing system and a device controllable using voice commands, audio data representing an utterance received by the device;
determining that a first content source provided content that was presented on a display screen associated with the device while at least a portion of the utterance was spoken;
receiving, from a first system component associated with the first content source and after receiving the audio data, contextual data representing at least a portion of the content, the first system component being remote from both of the device and the display screen;
determining, by the computing system and based at least in part on the audio data and the contextual data, an intent of the utterance;
determining output data corresponding to the intent; and
causing a command to be executed using the output data.

12. The method of claim 11, further comprising:
receiving, from the device, an indication that the content was being presented by the display screen while at least the portion of the utterance was spoken;
sending, to the first system component, a first inquiry to determine if the first content source provided the content;
sending, to a second system component associated with a second content source, a second inquiry to determine if the second content source provided the content;
receiving a response to the first inquiry; and
determining, based at least in part on the response, that the first content source provided the content.

13. The method of claim 11, further comprising:
determining that the intent is associated with the first content source.

14. The method of claim 11, further comprising:
determining that the intent is associated with a second content source; and
causing the command to be executed using the second content source.

15. The method of claim 11, further comprising:
generating entity data representing at least a portion of the audio data; and
causing the command to be executed further using the entity data.

16. The method of claim 11, further comprising:
determining that the command corresponds to an action to be performed, the action involving a list;
determining that the intent corresponds to a list position; and
determining, based at least in part on the contextual data, that a list position value is associated with the list position.

17. The method of claim 11, further comprising:
determining that the audio data represents an anaphoric term; and
causing the command to be executed further based at least in part on the anaphoric term.

18. The method of claim 11, further comprising:
determining an application associated with the intent, wherein causing the command to be executed comprises sending the output data to the application.

19. The method of claim 11, wherein the contextual data comprises at least first data representing a slot and second data representing a value associated with the slot.

20. The method of claim 11, further comprising:
determining, using the audio data, the intent;
determining that the intent is associated with at least a slot; and
requesting the contextual data from the first system component based at least in part on the slot.

21. The method of claim 11, further comprising:
causing the output data to further include the portion of the content.

22. The system of claim 1, wherein the at least one computer-readable medium is encoded with additional instructions which, when executed by the at least one processor, further cause the system to:
cause the output data to further include the portion of the content.

* * * * *